United States Patent [19]

Chigono et al.

[11] Patent Number: 5,659,852
[45] Date of Patent: Aug. 19, 1997

[54] IMAGE FORMING METHOD, IMAGE FORMING APPARATUS AND PROCESS CARTRIDGE

[75] Inventors: Yasunori Chigono; Harumi Ishiyama, both of Yokohama; Tadashi Furuya, Kawasaki; Seiji Mashimo, Tokyo, all of Japan

[73] Assignee: Canon Kabushiki Kaisha, Tokyo, Japan

[21] Appl. No.: 615,823

[22] Filed: Mar. 14, 1996

Related U.S. Application Data

[63] Continuation-in-part of Ser. No. 552,926, Nov. 3, 1995, abandoned, which is a continuation-in-part of Ser. No. 549,115, Oct. 27, 1995, abandoned.

[30] Foreign Application Priority Data

Oct. 31, 1994 [JP] Japan .................. 6-290393
Sep. 8, 1995 [JP] Japan .................. 7-231272

[51] Int. Cl.$^6$ .................................. G03G 15/02
[52] U.S. Cl. ................. 399/175; 361/214; 361/225; 399/174
[58] Field of Search ................ 355/219, 269, 355/270; 361/214, 225, 230; 430/124, 126, 106.6; 399/50, 174, 175, 168

[56] References Cited

U.S. PATENT DOCUMENTS

| | | | |
|---|---|---|---|
| 5,351,109 | 9/1994 | Haneda | 355/219 |
| 5,357,323 | 10/1994 | Haneda et al. | 355/219 |
| 5,367,365 | 11/1994 | Haneda et al. | 355/219 |
| 5,381,215 | 1/1995 | Haneda et al. | 355/219 |
| 5,384,626 | 1/1995 | Kugoh et al. | 355/219 |
| 5,426,489 | 6/1995 | Haneda et al. | 355/219 |
| 5,457,522 | 10/1995 | Haneda et al. | 355/219 |
| 5,467,176 | 11/1995 | Watanuki et al. | 355/270 |

FOREIGN PATENT DOCUMENTS

| | | |
|---|---|---|
| 0459607 | 12/1991 | European Pat. Off. . |
| 0575159 | 12/1993 | European Pat. Off. . |
| 0598483 | 5/1994 | European Pat. Off. . |
| 0615177 | 9/1994 | European Pat. Off. . |
| 63-149669 | 6/1988 | Japan . |
| 4-21873 | 1/1992 | Japan . |
| 4-34566 | 2/1992 | Japan . |
| 6-3921 | 1/1994 | Japan . |
| 6-194928 | 7/1994 | Japan . |
| 6-258915 | 9/1994 | Japan . |
| 6-258918 | 9/1994 | Japan . |
| 7-5748 | 1/1995 | Japan . |
| 7-219310 | 8/1995 | Japan . |
| 8-6353 | 1/1996 | Japan . |

OTHER PUBLICATIONS

Patent Abstracts Of Japan, vol. 16/No. 182 (corresponding to Japanese Laid–open Application No. 4–21873), published Apr. 30, 1992.

Primary Examiner—Matthew S. Smith
Attorney, Agent, or Firm—Fitzpatrick, Cella, Harper & Scinto

[57] ABSTRACT

The image forming method comprises, electrostatically charging an image bearing member using a contact charging assembly, forming an electrostatic latent image on the image bearing member thus charged, developing the electrostatic latent image with a magnetic toner to form a toner image and transferring the toner image to a transfer medium, wherein the charging assembly comprises a magnetic brush formed from conductive magnetic particles magnetically bound, and the charging assembly comes into contact with the image bearing member to charge the surface of the image bearing member by directly injecting charges into the electron level present on the surface of the image bearing member and the magnetic toner has a value of $\sigma.D.\delta$ of 150 or less, where the value is obtained by multiplying i) a magnetization quantity $\sigma$ (Am$^2$/kg) in a magnetic field of 1K oersted as measured by a vibration magnetometer, ii) a weight average particle diameter $(D_4)$ D (μm) of the magnetic toner and iii) a density $\delta$ (g/cm$^3$) thereof.

223 Claims, 6 Drawing Sheets

FIG. I

IMAGE FORMING METHOD, IMAGE FORMING APPARATUS AND PROCESS CARTRIDGE

BACKGROUND OF THE INVENTION

1. Field of the Invention

This is a Continuation-In-Part of prior application Ser. No. 08/552,926 filed Nov. 3, 1995, which is a Continuation-In-Part of prior application Ser. No. 08/549,115 filed Oct. 27, 1995 both of which are abandoned.

This invention relates to an image forming method which renders an electrostatic latent image visible by developing into a toner image, an image forming apparatus such as a copying machine or a printer using this image forming method, and a process cartridge detachable from the body of this image forming apparatus. More particularly, this invention relates to an image forming method, an image forming apparatus and a process cartridge which carry out charging by bringing a charging means into contact with an image bearing member (photosensitive member).

2. Related Background Art

As the charging device for electrophotography, the corona charging assembly has been hitherto used. Recently, as a substitute therefor, contact charging devices are being put into practice. Such contact charging devices aim at low ozone generation and low power consumption. In particular, roller charging using a conductive roller as a charging member, is preferably used in view of the stable charging.

In the roller charging system, a conductive elastic roller is brought into pressure contact with the object to be charged and voltages are applied thereto.

Here, not limiting to the roller charging system, when a charging member having a low resistance value is brought in contact with a drum having any scratches or pinholes on the drum surface, an excess leak current flows from the charging member to cause faulty charging around the fault, expansion of pinholes and electrical breakdown of the charging member. To prevent these problems, the charging member must have a resistance value of about $1 \times 10^4$ $\Omega$ or above. If, however, the resistance value exceeds $1 \times 10^7$ $\Omega$, the current necessary for charging cannot flow. Hence, the resistance value of the contact charging member must be within the range of from $1 \times 10^4$ to $1 \times 10^7$ $\Omega$.

In the roller charging system, the charging is mainly carried out by the discharge from the charging member to the member to be charged. Hence the charging takes place when a voltage above a certain threshold value is applied. For example, when a charging roller is brought into pressure contact with an OPC (organic photoconductor) photosensitive member having a 25 μm thick surface layer and voltage is applied thereto, the surface potential of the photosensitive member begins to rise at a voltage of about 640 kV, and beyond the threshold voltage the photosensitive member surface potential linearly increases at a slope of 1 to the applied voltage. This threshold value voltage is hereinafter defined as charging starting voltage $V_{th}$.

Namely, in order to obtain a necessary surface potential $V_d$ of the photosensitive for electrophotography, a DC voltage of $V_d + V_{th}$ must be applied to the charging roller. The charging carried out by applying only a DC voltage to the contact charging member in this way is called DC charging.

In DC charging, however, it is difficult to control the potential of the photosensitive member at the desired value since the resistance value of the contact charging member varies depending on the environmental changes, and the $V_{th}$ varies according to the change of the layer thickness due to scrapes of the photosensitive member.

Thus, in order to achieve steady charging, as disclosed in Japanese Patent Application Laid-open No. 63-149669, AC charging is applied to the contact charging member, which is a voltage produced by superimposing an AC component having a peak-to-peak voltage of $2 \times V_{th}$ or above, on a DC voltage corresponding to the desired $V_d$. This method aims at a potential-leveling effect due to AC, where the potential of the charged member converges to $V_d$, the middle point of the AC peak potentials, and is by no means affected by external disturbance such as environmental changes. However, even in such contact charging devices, its fundamental charging mechanism utilizes the phenomenon of discharging from the charging member to the photosensitive member. Hence, as previously stated, the voltage necessary for charging must be higher than the photosensitive member surface potential and ozone is generated a little. Ozone is also generated when AC charging is carried out in order to achieve uniform charging.

Then, as a new charging system, a charging system using direct injection of charges into the photosensitive member is proposed in Japanese Patent Application Laid-open No. 6-3921 and European Patent Application No. 0615177. In this contact charging system, a voltage is applied to the contact charging member such as a charging roller, a charging brush or a charging magnetic brush so that charges are injected into a float electrode on the photosensitive member provided with an injection layer on its surface. Specifically, Japanese Patent Application Laid-open No. 6-3921, describes that charge injection layer can be formed on the surface of the photosensitive member by coating an acrylic resin in which a conductive filler, $SnO_2$ particles made conductive by doping with antimony, is dispersed. The magnetic brush is a charging member comprising conductive magnetic particles magnetically bound on a magnet roll so as to form a brush, and the brush is brought into touch with the photosensitive member to carry out charging. Since no discharging phenomenon is utilized in this charging system, the DC voltage necessary for charging is equal to the desired photosensitive member surface potential, and also no ozone is generated.

FIG. 6 schematically illustrates a prior art system. A magnetic brush charging assembly 202, an exposure assembly 203, a developing assembly 208, a transfer charging assembly 205 and a cleaner member 206 are provided around a photosensitive member 201 having a charge injection layer, and in addition a fixing assembly 207 for fixing the toner on a recording paper P is provided to make up the system.

The magnetic brush charging assembly 202 is constituted of a non-magnetic sleeve 222, a magnet roll 221 provided inside the sleeve and conductive magnetic particles 223 magnetically bound onto the non-magnetic sleeve 222, where the sleeve is kept to stand at a given distance from the photosensitive member 201 so as for the brush to come in touch with the photosensitive member to uniformly charge it by charge injection.

Japanese Patent Application Laid-open No. 4-34566 discloses an electrophotographic apparatus employing a magnetic brush and no cleaning assembly, that is, this embodies a process dispensing with a cleaner. The cleaner having an elastic blade takes off and recovers the toner remaining on the photosensitive member after the transfer of the toner image. It brings about a superior image forming apparatus with a low running cost and no waste toner production as well as the compact size.

However, conventional magnetic brush charging assemblies have the problem that the toner having escaped from the cleaner zone and remained on the photosensitive drum enters the charging magnetic brush and gradually accumulates there to deteriorate the charging performance. Once the toner has escaped from the cleaner and entered the charging magnetic brush, the insulating toner moves around inside the brush and blocks the conducting path between conductive magnetic particles themselves or between the particles and the photosensitive drum to deteriorate the charging performance. When this occurs, the magnetic binding force of the magnetic brush extends to the magnetic toner, so that the toner is accumulated in the magnetic brush and melt-adheres to the surfaces of the conductive magnetic particles. Hence, it has been difficult to continue charging over a long period of time.

In the constitution having no cleaner, the remaining toner after the toner image transfer may intrude into the brush in a large quantity and accumulate there to cause deterioration of charging assemblies thus causing faulty charging. Also during long term printing, the recovery of the toner from the photosensitive member becomes low and the magnetic brush charger cannot charge any more because of the high resistance caused by the toner accumulated in it.

SUMMARY OF THE INVENTION

An object of the present invention is to provide an image forming method, an image forming apparatus and a process cartridge that have solved the problems discussed above.

Another object of the present invention is to provide an image forming method, an image forming apparatus and a process cartridge that enable toner to be temporarily taken into, and unloaded from the magnetic brush so that faulty charging is prevented to form good images.

Still another object of the present invention is to provide an image forming method, an image forming apparatus and a process cartridge that enable the toner to be temporarily collected in, and unloaded from the magnetic brush smoothly so that high quality images can be obtained over a long period of time.

The present invention provides an image forming method comprising:

electrostatically charging an image bearing member by a charging means;

forming an electrostatic latent image on the image bearing member thus charged, by a latent image forming means;

developing the electrostatic latent image with a magnetic toner to form a toner image; and transferring the toner image to a transfer medium;

wherein;

the charging means comprises a charging assembly having a magnetic brush formed from magnetically bound conductive magnetic particles; the charging assembly electrostatically charges the surface of the image bearing member by coming into contact with the image bearing member and directly injecting charges into the surface of the image bearing member; and the magnetic toner has a value of $\sigma.D.\delta$ of 150 or less, where the value is obtained by multiplying i) a magnetization quantity $\sigma$ ($Am^2/kg$) in a magnetic field of 1K oersted as measured by a vibration magnetometer, ii) a weight average particle diameter ($D_4$) D (μm) of the magnetic toner and iii) a density $\delta$ ($g/cm^3$) thereof.

The present invention also provides an image forming apparatus comprising:

an image bearing member for bearing an electrostatic latent image;

a charging means for electrostatically charging the image bearing member;

a latent image forming means for forming an electrostatic latent image on the image bearing member charged;

a developing means holding a magnetic toner, for rendering the electrostatic latent image visible by development to form a toner image; and a transfer means for transferring the toner image to a transfer medium;

wherein;

the charging means comprises a charging assembly having a magnetic brush formed from magnetically bound conductive magnetic particles; the charging assembly electrostatically charges the surface of the image bearing member by coming into contact with the image bearing member and directly injecting charges into the surface of the image bearing member; and the magnetic toner has a value of $\sigma.D.\delta$ of 150 or less where the value is obtained by multiplying i) a magnetization quantity $\sigma$ ($Am^2/kg$) in a magnetic field of 1K oersted as measured by a vibration magnetometer, ii) a weight average particle diameter ($D_4$) D (μm) of the magnetic toner and iii) a density $\delta$ ($g/cm^3$) thereof.

The present invention also provides a process cartridge detachably mountable to a main assembly of an image forming apparatus, comprising:

an image bearing member for bearing an electrostatic latent image;

a charging means for electrostatically charging the image bearing member; and a developing means for rendering visible the electrostatic latent image held on the image bearing member, by development to form a toner image;

wherein;

the charging means comprises a charging assembly having a magnetic brush formed from magnetically bound conductive magnetic particles; the charging assembly electrostatically charges the surface of the image bearing member by coming into contact with the image bearing member and directly injecting charges into the surface of the image bearing member; and the magnetic toner has a value of $\sigma.D.\delta$ of 150 or less obtained by multiplying i) a magnetization quantity $\sigma$ ($Am^2/kg$) in a magnetic field of 1K oersted as measured by a vibration magnetometer, ii) a weight average particle diameter ($D_4$) D (μm) of the magnetic toner and iii) a density $\delta$ ($g/cm^3$) thereof.

DESCRIPTION OF THE PREFERRED EMBODIMENTS

Figure 1:
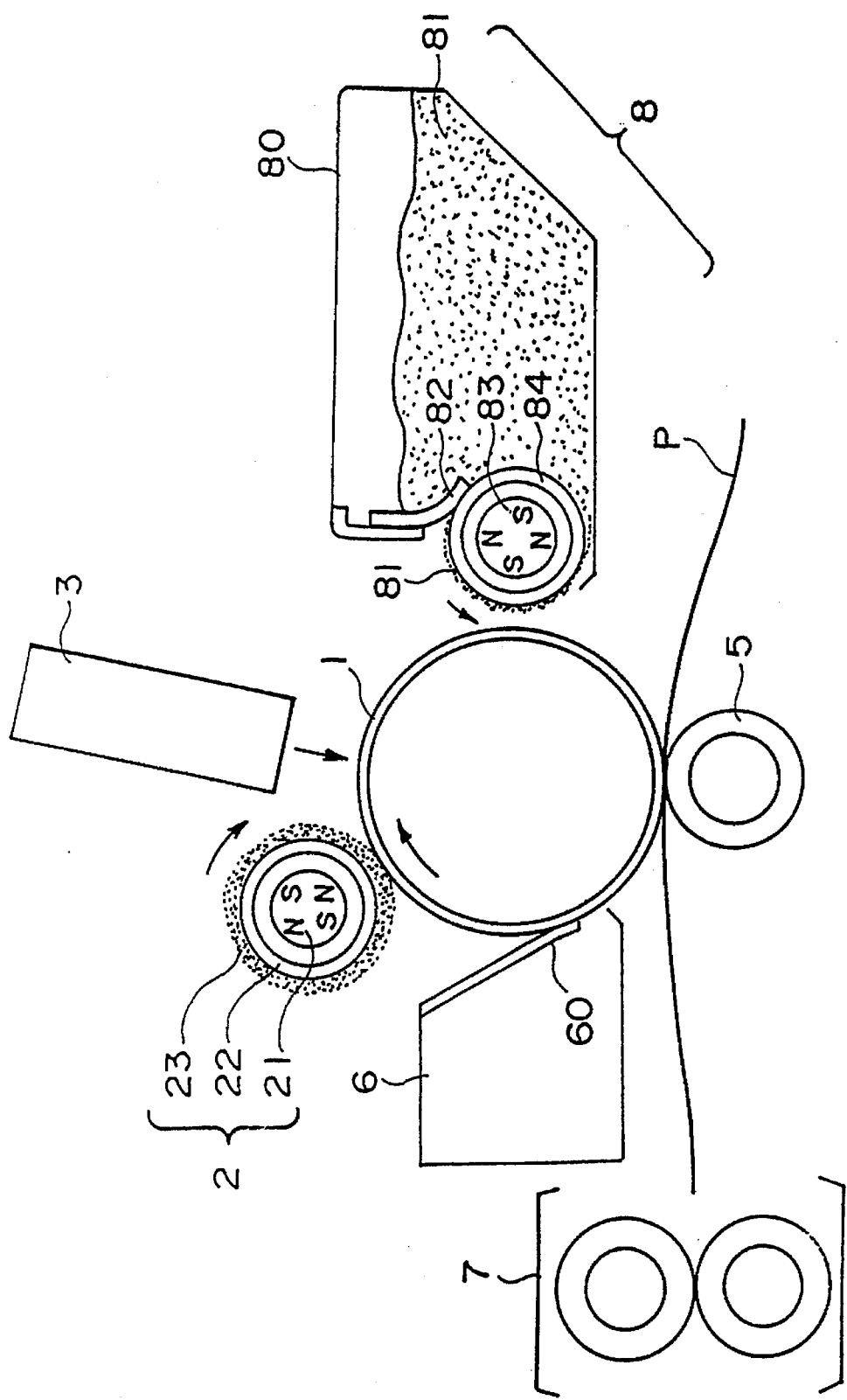
FIG. 1 schematically illustrates an image forming apparatus according to a first embodiment of the present invention.

In the present invention, a magnetic toner is used. The magnetic toner not transferred and remaining on the photosensitive member after the toner image transfer contains magnetic toner having been charged in reverse polarity by the action of transfer voltage applied during the toner image transfer. When this remained magnetic toner after the transfer come to the magnetic brush charging assembly, it contaminates, or is collected (or taken-in) into the inside of the magnetic brush. The collected magnetic toner comes into contact with conductive magnetic particles forming the magnetic brush, so that an appropriate triboelectricity of regular polarity is imparted to the toner including the magnetic toner having been charged in the reverse polarity. This magnetic toner imparted with an appropriate triboelectricity in regular polarity has σ.D.δ value of 150 or less, calculated by multiplying i) a magnetization quantity σ ($Am^2/kg$) in a magnetic field of 1K oersted measured by a vibration magnetometer, ii) a weight average particle diameter ($D_4$) D (μm) of the magnetic toner and iii) a density δ ($g/cm^3$) thereof, thus this magnetic toner is weak in the magnetic binding force. Hence, due to the potential difference between the magnetic brush charging assembly and the image bearing member when the surface of the image bearing member is charged by the magnetic brush charging assembly, the toner is well unloaded (or emitted) from the magnetic brush to the image bearing member. More specifically, when the surface of the image bearing member is charged by the magnetic brush charging assembly, the magnetic brush has a high resistance under application of a low electric field and hence the potential on the side of the image bearing member surface becomes lower by about 5 to 50 V than that of the magnetic brush charging assembly, so that, on account of this potential difference, the magnetic toner imparted with an appropriate triboelectricity in regular polarity repulses the magnetic brush, and moves from the magnetic brush charging assembly to the image bearing member overcoming the weak magnetic binding force of the magnetic brush, as in development.

Thus, the magnetic toner which has entered the charging assembly, can be unloaded from the magnetic brush when it acquires enough triboelectricity so that the electrostatic attraction force between the image bearing member surface becomes stronger than the weak magnetic binding force between the magnetic brush, and hence the accumulation of the magnetic toner having entered the magnetic brush charging assembly is prevented does not result in poor performance or melt adhesion of the toner component to the surfaces of the conductive magnetic particles.

In addition, since the toner is a magnetic toner and the magnetic binding force is acting on the magnetic brush, it does not come off from the magnetic brush easily not causing scattering, and it can receive sufficient triboelectricity of regular polarity surely and in a short time.

In the present invention, the value of σ.D.δ of the magnetic toner is 150 or less, preferably from 50 to 150, and more preferably from 100 to 130.

If this value of σ.D.δ exceeds 150, the magnetic binding force acting between the magnetic toner and the magnetic brush becomes so strong that the release of the magnetic toner from the magnetic brush charging assembly becomes difficult. When the value of σ.D.δ is 50 or more, the magnetic toner can have an appropriate magnetic binding force, thus it may hardly come off from the magnetic brush and scatter in the magnetic brush charging assembly, ensuring the acquisition of the appropriate triboelectricity of regular polarity in a short time, and no magnetic toner accumulates inside the magnetic brush of the charging assembly, making it superior in view of durability. Also since the magnetic toner can be surely taken into the magnetic brush charging assembly, the magnetic toner remaining and having been charged in reverse polarity after the toner image transfer can be charged in regular polarity and transferred to the image berating member. Hence, when applied to a method in which the toner remaining after the transfer is removed at the time of developing, this is particularly preferable because of good cleaning.

In the present invention, the magnetization quantity σ of the magnetic toner may preferably be from 10 to 30 $Am^2/kg$, and more preferably from 5 to 20 $Am^2/kg$. If the magnetization quantity σ of the magnetic toner exceeds 30 $Am^2/kg$, the content of the magnetic material is so large that fixing performance of the toner becomes poor. Also, if it is less than 10 $Am^2/kg$, the magnetic properties themselves may be lost resulting in substantial lowering in the transport performance of toner and in the collection of the toner into the magnetic brush.

In the present invention, the magnetization quantity of the magnetic toner is measured by a vibration magnetometer VSM-3S-15 (manufactured by Toei Kogyo K.K.) under application of a magnetic field of 1K oersted.

In the present invention, the weight average particle diameter D of the magnetic toner may preferably be from 2 to 20 μm, and more preferably from 4 to 8 μm. If the weight average particle diameter D is larger than 20 μm, latent images can not be accurately developed greatly lowering the image quality. Also, if it is smaller than 2 μm, such problems as black spots around the image or increased fog will occur on developing.

In the present invention, the weight average particle diameter of the magnetic toner is measured using a Coulter counter Multisizer II (manufactured by Coulter Co.) to determine weight-based weight average particle diameter calculated from volume distribution.

In the present invention, the density δ of the magnetic toner may preferably be from 1.1 to 2.0, more preferably from 1.1 to 1.6, and still more preferably from 1.4 to 1.6. If the density δ exceeds 2.0, the toner has such a large content of magnetic material that its fixing performance may lower. Also, if it is less than 1.1, the selection of magnetic materials may become greatly restricted.

In the present invention, the density of the magnetic toner means the true density of particles, and the true density is measured using a dry density meter ACCUPYC 133 (manufactured by Shimadzu Corporation).

The magnetic toner of the present invention may preferably have insulating properties with a volume resistivity of $10^9$ Ω.cm or above, and more preferably $10^{10}$ Ω.cm or more, further more preferably $10^{14}$ Ω.cm or more. If the volume resistivity of the magnetic toner is less than $10^9$ Ω.cm, it is difficult for the magnetic toner itself to have sufficient charges, lowering the developing performance and deteriorating the image quality.

In the present invention, the volume resistivity of the magnetic toner is measured in the following way. A particulate sample is put in an aluminum ring of 40 mm diameter, which is then press-molded at 2,500N, and the volume resistivity of the molded product is measured on a resistivity meter LOWRESTER AP or HIGHRESTER IP (both manufactured by Mitsubishi Yuka Co., Ltd.), using a four-terminal probe. The measurement is made in an environment of 20° to 25° C. and 50 to 60% RH.

Charging performance can be more improved when a voltage produced by superimposing AC voltage on DC voltage is applied to the magnetic brush charging assembly, making the effect of the present invention greater.

In the cleanerless constitution, most of the toner remaining on the image bearing member after passing through the transfer charging assembly, temporarily enters the magnetic brush charging assembly. Therefore, a large quantity of the toner enters the magnetic brush and it is greatly effective to employ the constitution according to the present invention.

In image forming apparatus where the outermost surface layer of the image bearing member contains conductive fine particles dispersed in binder resin and the image bearing member is electrostatically charged by direct injection of the charges into the electron level on the surface layer, more excellent image formation can be maintained by employing the constitution according to the present invention in which the magnetic force is appropriately controlled on account of the small potential difference between the charging assembly and the image bearing member.

The present invention will be described in detail with reference to the accompanying drawings.

FIG. 1 is a cross-section of an image forming apparatus according to a first embodiment of the present invention. The apparatus comprises a photosensitive drum 1 serving as an image bearing member having a charge injection function on its surface, and provided around it a magnetic brush charging assembly 2 as a charging means, an exposure assembly 3 as a latent image forming means, a developing assembly 8 as a developing means, a transfer charging assembly 5 as a transfer means, a cleaner member 6 as a cleaning member, and a fixing assembly 7 as a fixing means.

Figure 2:
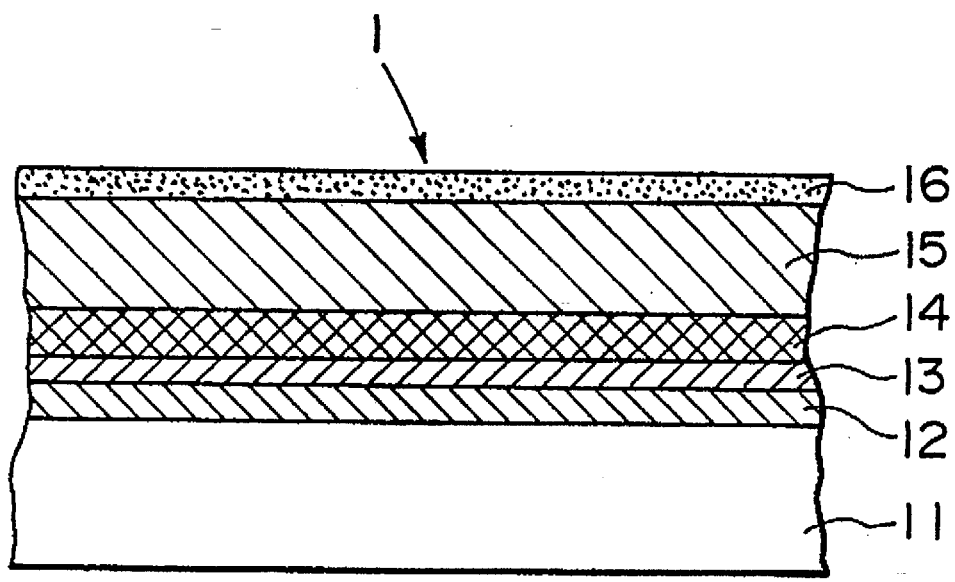
FIG. 2 illustrates detailed partial structure of an image bearing member (a photosensitive drum) used in the first embodiment.

The magnetic brush charging assembly 2, developing assembly 8 and photosensitive drum 1 which are important in the present invention will be detailed about their constitution. Details of the photosensitive drum 1 are shown in FIG. 2. The photosensitive drum 1 has the structure that On an aluminum substrate 11 a subbing layer 12, a positive charge injection blocking layer 13, a charge generation layer 14 and a charge transport layer 15 are provided by coating in this order to form an organic photoconductor (OPC) drum, on the surface of which a charge injection layer 16 is further provided. The charge injection layer 16 may preferably be a resin layer in which conductive fine particles are dispersed in an amount of from 20 to 100 parts by weight based on 100 parts by weight of a resin such as photo-curable acrylic resin. As the conductive fine particles, a white or transparent material such as $SnO_2$, $TiO_2$ or ITO may be used. The conductive fine particles may preferably have an average particle diameter of 1 μm or smaller, and more preferably within the range of from 0.5 to 50 nm for the purpose of uniform charging.

In the present invention, the average particle diameter of the conductive fine particles is determined by randomly sampling at least 100 particles under a scanning electron microscope, calculating volume particle size distribution on the basis of maximum horizontal-direction chord length, and regarding its 50% average particle diameter as the average particle diameter.

As the resin that binds the conductive fine particles, it is possible to use resin materials such as acrylic resin, polycarbonate, polyester, polyethylene terephthalate and polystyrene. In addition, in order to improve lubricity of the photosensitive drum surface, an active material such as Teflon may be added in the charge injection layer in an amount of from 10 to 40 parts by weight based on 100 parts by weight of the resin. For the purpose of film formation, a cross-linking agent and a polymerization initiator may be added in appropriate amounts. The charge injection layer 16 is a layer intentionally prepared as an injection site through which charges are directly injected from the magnetic brush charging assembly 2 to uniformly charge the surface. The charge injection layer 16 must have a resistance value of $1 \times 10^8$ Ω.cm or above so that the charges of latent images do not flow through the surface.

In the present invention, the resistance value of the charge injection layer 16 is determined by measuring the surface resistance of a charge injection layer formed on an insulating sheet using a high-resistance meter 4329A, manufactured by HP Co., under an applied voltage of 100 V.

In the present invention, it is important for the surface layer of the photosensitive member to have an electron level where electrons can be endowed, and by no means limited to the structure of an independent charge injection layer. In view of maintaining charging performance, however, it is especially more advantageous to provide a charge injection layer having a good lubricity, since the surface can give good releasability to the toner improving the transfer efficiency and decreasing the toner which escapes from the cleaner and enters the brush. The charging performance can be greatly improved by forming a layer especially made to have the injection function.

The magnetic brush charging assembly 2 is constituted of a non-magnetic sleeve 22, a magnet roll 21 provided inside the sleeve 22 and conductive magnetic particles 23 magnetically bound on it. The magnetic strength of the magnetic brush charging assembly on the sleeve surface, is preferably 400–1500 gauss, more preferably 600–1300 gauss, in view of satisfactory unloading of the magnetic toner from the magnetic brush.

In addition, it is preferable that the number of the magnetic poles used in the magnetic brush charging assembly is 2 or more.

The position of the magnetic poles of the magnet roll in the magnetic brush charging assembly is preferably set so that the peak of the magnetic force may be present within an angle of 20°, more preferably of 10°, in the rotation direction of the photosensitive drum, measuring from the line connecting the centers of the photosensitive drum and the magnetic brush charging assembly, in view of satisfactory unloading of the magnetic toner from the magnetic brush.

The magnetic brush comes in touch with the surface of the photosensitive drum 1 by bringing in touch the longitudinal ends of the sleeve 22 with the photosensitive drum 1, at these ends spacer members are provided (not shown) to keep a distance of 0.5 mm between the surfaces of the sleeve 22 and the photosensitive drum 1. The sleeve 22 is rotated in the same direction as the drum 1 (in the clockwise direction as viewed in FIG. 1) while the magnet roll 21 is set stationary. Then, at the time of charging, a desired voltage is applied to the sleeve 22, whereupon charges are injected into the charge injection layer 16 and the surface of the photosensitive drum 1 is finally electrostatically charged (supplied with electrostatic charge) to the same potential as the magnetic brush.

For the conductive magnetic particles, various materials may be used which are single-component crystals or mixed crystals of conductive metals such as ferrite and magnetite.

They are conductive particles once sintered, which are then subjected to reduction or oxidation treatment and controlled to have the resistance value stated later. As the other conductive magnetic particles, a particulate conductive magnetic material may be kneaded into a binder polymer and formed into particles containing the conductive magnetic material dispersed in the binder polymer, or the above conductive magnetic particles may be further coated with a resin. In this instance, the resistance of the coating resin layer is controlled by adjusting the content of a conductive agent such as carbon in the resin so that the resistance of the whole conductive magnetic particles is controlled.

In the present invention, as the conductive magnetic particles, those having an average particle diameter of from 1 to 100 μm may be used, and preferably those of from 5 to 50 μm are advantageous in view of both the charging performance and the maintenance of the particles.

In the present invention, the average particle diameter of the conductive magnetic particles is determined by randomly sampling at least 100 particles under a scanning electron microscope, calculating volume particle size distribution on the basis of maximum horizontal-direction chord length, and regarding its 50% average particle diameter as the average particle diameter.

In the present invention, the conductive magnetic particles may preferably have a volume resistivity of $10^{10}$ Ω.cm or below, and more preferably from $10^6$ to $10^9$ Ω.cm. If the volume resistivity of the conductive magnetic particles exceeds $10^{10}$ Ω.cm, necessary electric current for charging may not flow, lowering the image quality due to the faulty charging.

In the present invention, the volume resistivity of the conductive magnetic particles is calculated and normalized from the electric currents flowing in a system wherein 2 g of the conductive magnetic particles 23 are filled in a cylindrical container with a bottom area of 228 mm$^2$ and pressed, and to which a voltage of 100 V is applied from top and bottom.

As to the magnetic properties, the conductive magnetic particles may preferably have a saturation magnetization of 30 Am$^2$/kg or above, and more preferably from 40 to 300 Am$^2$/kg. There are no particular limitations to the coercive force and residual magnetization.

In the present invention, the magnetization is measured using a vibration magnetometer VSM-3S-15 (manufactured by Toei Kogyo) under application of a magnetic field of 5K Oersteds, and the quantity of magnetization thus measured is regarded as saturation magnetization.

The constitution of the magnetic brush is not specifically limited to the above mentioned constitution in the present invention. The conductive magnetic particles may be directly supported on the magnet roll without using a sleeve, to carry out charging.

The constitution of the developing assembly 8, which is a one-component, weak magnetic toner developing assembly, will be described below.

As shown in FIG. 1, the developing assembly 8 serving as the developing means is constituted of a developer container 80 holding a weak magnetic toner 81, an aluminum sleeve 84 as a developing sleeve, internally provided with a magnet roll 83, and an elastic blade 82 provided in touch with the sleeve as a control means. The aluminum sleeve 84 has a surface of a desired roughness, and triboelectrically charges the weak magnetic toner 81 by the friction with the blade 82, where the sleeve is uniformly coated with the charged weak magnetic toner 81.

Although the developing assembly 8 is an example of a developing assembly using a one-component weak magnetic toner, the developing system is not limited to it. In the present invention, it is essential to use a magnetic toner having a lower magnetic binding force than that of conventional magnetic toners. The magnetic binding force of the toner increases as the magnetization quantity σ (Am$^2$/kg), the weight average particle diameter (D$_4$) D (μm) and the density δ (g/cm$^3$) of the toner increase. When the value of σ.D.δ which is obtained by multiplying these three values is used as an index of the magnetic binding force of the toner, our experiments have revealed that the toner having a controlled σ.D.δ value of 150 or less, which are conventionally as great as 250 to 400, can be normally transported at the time of development and also the magnetic toner once entered the magnetic brush charging assembly 2 can be unloaded from the brush, so that good image recording can be achieved.

More preferably, the value of σ.D.δ may be controlled within the range of from 50 to 150, whereby good images can be obtained, even when printing is carried out for a long time. Namely, the magnetic toner having slipped away or escaped from the cleaner can be immediately taken in and unloaded from the brush due to the appropriate magnetic binding force even when copying or printing is repeated.

In the present invention, the magnetic brush is not limited to the one to which only DC bias is applied. AC bias may be superimposed thereon so that the charging performance can be made more stable. In this case, the difference between the DC component applied to the magnetic brush and the potential of the photosensitive member further decreases compared with the case when only DC bias is applied. Hence, the effect of the magnetic binding force is large and the magnetic toner can be taken into the magnetic brush charging assembly.

In the present invention, the weak magnetic toner having a value of σ.D.δ of 150 or less can form dense and short toner ears, and consequently enables development in high density and minuteness.

The magnetic toner is obtained by mixing a known binder resin, magnetic particles and a charge control agent, followed by the steps of kneading, pulverization and classification, and addition of a fluidity-providing agent. The magnetic binding force of the magnetic toner can be controlled to an appropriate value by making the magnetic particles from a material of low magnetization or by adjusting the amount of the magnetic particles. What is important in the present invention is that, so long as the magnetic toner has a value of σ.D.δ of 150 or less, the magnetic toner having entered the magnetic brush charging assembly can be unloaded from the brush overcoming the magnetic force of the magnetic brush, thereby preventing faulty charging and enabling maintenance of good image formation.

The operation of the image forming apparatus according to the first embodiment of the present invention is described below. A voltage of −700 V is applied to the sleeve 22 of the magnetic brush charging assembly 2 previously described, and the photosensitive drum 1 is charged to the same potential. Thereafter, in accordance with an image pattern, image areas are scanned using the exposure assembly 3 such as a laser scanner to form an electrostatic latent image on the photosensitive drum. Thereafter, a voltage produced by superimposing on a DC voltage of −500 V a rectangular wave AC voltage with a frequency of 1.8 kHz and a peak-to-peak voltage of 1.6 kV is applied to a developing sleeve 84 set stationary at a distance of 0.3 mm from the surface of the photosensitive drum, where, using a negatively triboelectrically charged magnetic toner 81 carried onto the developing sleeve 84, the latent image is developed in the presence of the electric field formed at the image areas. The toner image thus formed by development and held on the photosensitive drum is transferred to a recording medium P serving as the transfer medium which has been electrostatically charged on its back by means of the transfer charging assembly 5 serving as the transfer means. Then the toner image is fixed to the recording medium P by means of the fixing assembly 7 serving as the fixing means. In the transfer charging assembly 5, a transfer roller comprising a mandrel and a foam material layer of medium-resistance is used. A roller with a resistance value of $5 \times 10^8$ Ω is used and a voltage of +2.0 kV is applied to the mandrel to carry out the transfer. After the transfer, the magnetic toner remained on the photosensitive drum is scraped off by a cleaner 6 having a cleaning member 60, provided between the transfer zone and the charging zone and serving as the cleaning means, and the photosensitive drum is again electrostatically charged by means of the magnetic brush charging assembly 2. Images can be formed on the transfer medium by repeating the above procedure.

Since it is difficult to completely remove the magnetic toner remained on the photosensitive drum after the transfer by the cleaner 6 having the cleaning member 60, a very small quantity of the toner stands adhered to the surface of the photosensitive drum. When the drum is again charged using the magnetic brush charging assembly 2, the magnetic toner, if it is a conventional magnetic toner having a strong magnetic binding force, adheres to the magnetic brush to cause the problem of faulty charging. This is a phenomenon that the magnetic toner having penetrated in the conductive magnetic particles 23 blocks the conducting paths between the conductive magnetic particles 23 themselves and between the conductive magnetic particles 23 and the photosensitive drum, resulting in occurrence of faulty charging. Moreover, if the magnetic toner is present between the conductive magnetic particles 23 in a large quantity, the magnetic toner melt-adheres to the conductive magnetic particles 23 to greatly deteriorate the charging performance and it becomes difficult to continue charging over a long period of time. However, in the present invention, since the magnetic toner of weak magnetic properties is used, the magnetic toner entering the magnetic brush charging assembly 2 is immediately provided with an appropriate triboelectricity of regular polarity and unloaded from the magnetic brush. Thus, faulty charging can be prevented and running performance can be improved.

When printing is continued for a long time, the magnetic toner having escaped from the cleaner becomes an obstacle to charging. During long printing, a certain quantity of the magnetic toner contaminates the magnetic brush, and as a result, the resistance of the magnetic brush charging assembly increases. Hence the magnetic toner present on the photosensitive drum hinders charging. In such a case, by imparting a certain quantity of magnetic binding force to the magnetic toner, the magnetic toner can be immediately taken into and unloaded from the magnetic brush, enabling continuous printing for a long period of time.

In the present invention, the object of the invention can be more advantageously achieved in the constitution where the charge injection layer is provided on the surface of the photosensitive member. A charge injection layer with a good surface lubricity contributes an increase in transfer efficiency of the magnetic toner and a decrease in quantity of the magnetic toner remaining after the transfer. Such a charge injection layer enables quick charging, and hence the potential difference between the magnetic brush charging assembly and the photosensitive member becomes smaller. Thus, control of the magnetic binding force at an appropriate value enables the toner to be more immediately taken in and unloaded.

As described above, in the present invention, so long as the value of σ.D.δ is 150 or less, and preferably from 50 to 150, the magnetic toner is immediately collected into the magnetic brush charging assembly and then unloaded from the magnetic brush, and thus good charging can be carried out without blocking the conducting path between the conductive magnetic particles themselves or between the conductive magnetic particles and the photosensitive drum.

Figure 3:
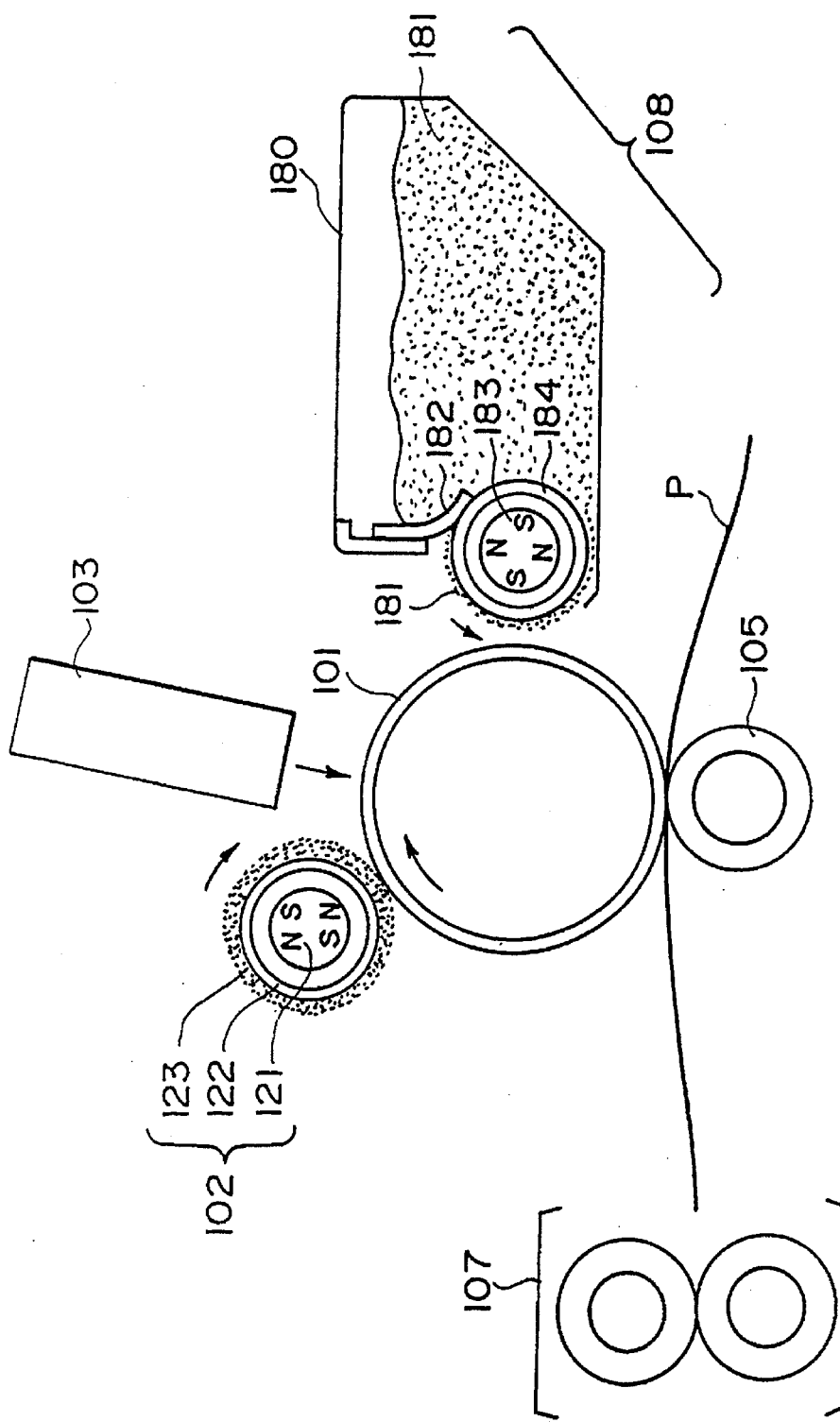
FIG. 3 schematically illustrates an image forming apparatus according to a second embodiment of the present invention.

FIG. 3 schematically illustrates a second embodiment of the present invention. The image forming apparatus shown therein comprises a photosensitive drum 101 having a photosensitive layer which serves as the image bearing member, a magnetic brush charging assembly 102 as the charging means, an exposure assembly 103 as the latent image forming means, a developing assembly 108 as the developing means, a transfer charging assembly 105 as the transfer means, and a fixing assembly 107 as the fixing means provided around the drum. This image forming apparatus is a cleanerless image forming apparatus not equipped with a cleaner having a cleaning member. A cleanerless image forming apparatus employing the magnetic brush charging assembly 102 will be detailed here. The photosensitive drum 101 as the image bearing member has the same constitution as that of the photosensitive drum 1 used in the first embodiment.

The main constitution of the magnetic brush charging assembly 102 is similar to that of the first embodiment. The bias applied to the magnetic brush, however, is a negative DC voltage equal to the potential of the charging drum superimposed by a desired AC voltage. This makes it possible to recollect the magnetic toner remaining after the transfer on the photosensitive member and diffuse it again on the photosensitive member, and the photosensitive member can be charged.

Most of the magnetic toner remaining on the photosensitive drum after the transfer have reversed polarity, that is, a positive charge. However, once it has passed through the magnetic brush, the magnetic toner has regular polarity, that is, a negative charge. Accordingly, by controlling the bias of the developing assembly, the cleaning and development of the photosensitive drum can be simultaneously carried out by the developing assembly. For example, assume that charged drum potential is −700 V and post-exposure potential is −100 V, a DC voltage of −450 V superimposed by a desired AC voltage may be applied to a developing sleeve 184, whereby the magnetic toner at the unexposed area (non-image area) on the photosensitive drum is collected onto the developing sleeve and at the same time the exposed area (image area) is developed by the magnetic toner on the developing sleeve.

As the magnetic toner, it is suitable to use a spherical magnetic toner that can lessen the quantity of remaining toner after the toner image transfer. Such spherical magnetic toner has superior fluidity and has superior releasability between the toner particles themselves and between the toner and the photosensitive drum, promising high transfer efficiency.

In general, in the cleanerless image forming apparatus, the magnetic toner remaining after the transfer should pass through the magnetic brush charging assembly before it returns to the developing assembly, and hence the quantity of the magnetic toner taken into the magnetic brush charging assembly is larger than that in the image forming apparatus provided with a cleaner having a cleaning member. The use of the above spherical magnetic toner, however, as having a high transfer efficiency, can reduce the quantity of toner taken into the magnetic brush charging assembly to hardly deteriorate the magnetic brush.

In the present invention, the spherical magnetic toner refers to a toner having a toner shape coefficient SF-1 within the range of from 100 to 150, and SF-2, from 100 to 130.

This spherical magnetic toner may more preferably have a toner shape coefficient SF-1 within the range of from 100 to 145, and SF-2, from 100 to 125.

The SF-1 and SF-2, the shape coefficients as used in the present invention, are determined as follows: 100 particles of the toner are randomly selected under FE-SEM (S-800; a scanning electron microscope manufactured by Hitachi Ltd.) introducing their image information to an image analyzes (LUSEX-3; manufactured by Nikore Co.) via the interface for analysis, and then the shape coefficients SF-1 and SF-2 are calculated according to the following expression.

$$SF\text{-}1 = (MXLNG)_2 / AREA \times \pi/4 \times 100$$
$$SF\text{-}2 = (PERI)_2 / AREA \times 1/4\pi \times 100$$

(AREA: projected area Of toner particle; MXLNG: absolute maximum length; PERI: peripheral length.)

The shape coefficient SF-1 of the toner indicates the degree of sphericity; the greater the value is, the more amorphous (shapeless) the toner particles are rather than spherical. SF-2 indicates the degree of irregularity; the greater the value is, the more irregular the toner particle surfaces are.

The image forming apparatus according to the second embodiment of the present invention is operated as described below. To the magnetic brush charging assembly 102, a voltage produced by superimposing on a DC voltage of −700 V a rectangular wave AC voltage with a frequency of 1 kHz and a peak-to-peak voltage of 600 Vpp is applied, and the photosensitive member is charged to about −700 V by means of the magnetic brush. Thereafter, the imagewise exposure is carried out by the exposure assembly 103 to form an electrostatic latent image, which is then reverse-developed by means of the developing assembly 108. The toner image thus formed by development and held on the photosensitive member is transferred to a recording medium P, the transfer medium electrostatically charged on its back by means of the transfer charging assembly 105. Then the toner image thus transferred is fixed on the recording medium P by means of the fixing assembly 7 serving as the fixing means. The magnetic toner remaining after the transfer is carried on the photosensitive member and reaches the magnetic brush charging assembly 102. The magnetic brush charging assembly 102 takes the remaining magnetic toner off the surface of the photosensitive member, and at the same time electrostatically charges the photosensitive member to the desired potential.

In the present invention, the use of the weak magnetic toner having a lower magnetic binding force than that of the conventional ones enables immediate collection of the magnetic toner into and unloading of it from the magnetic brush even in the cleanerless constitution where the magnetic toner remaining after the transfer enters the magnetic brush in a large quantity, whereby the amount of the magnetic toner present in the magnetic brush is limited, thus the performance of the magnetic brush is maintained and the photosensitive member is properly charged for good image formation.

In the cleanerless constitution where the magnetic toner remaining after the transfer enters the magnetic brush charging assembly in a large quantity, the employment of the constitution according to the present invention is greatly effective, since the circulation of the toner is promoted making the toner accumulation difficult, avoiding the contamination of the magnetic brush, due to the appropriate magnetic binding force of the toner, which results in the maintenance of the charging performance over a long period of time.

In both the first and second embodiments described above, the transfer medium to which the developed toner image on the image bearing member is transferred, was described as a recording medium such as paper, i.e., a final transfer medium. In the present invention, it is also possible to use a belt- or pipe-type intermediate transfer medium as the transfer medium, where such an intermediate transfer medium is provided opposingly to the image bearing member, and, after the toner image on the image bearing member has been transferred to this intermediate transfer medium, the toner image is again transferred to the final transfer medium.

When the intermediate transfer medium is used, the transfer step becomes plural and hence it is preferable to use the spherical magnetic toner having a better transfer efficiency.

Figure 4:
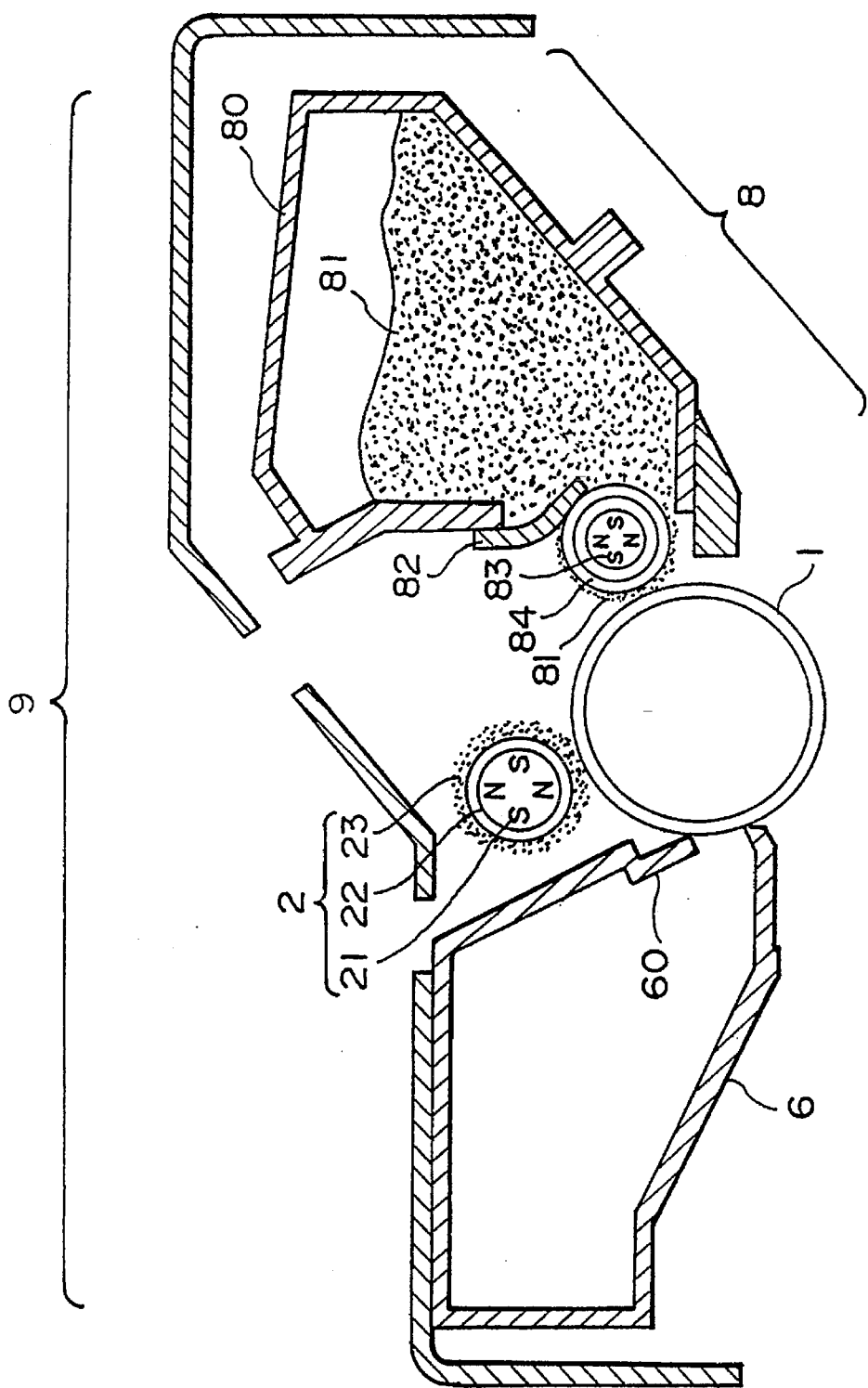
FIG. 4 schematically illustrates a process cartridge according to a first embodiment of the present invention.

FIG. 4 illustrates a process cartridge according to the first embodiment of the present invention. To explain this process cartridge according to the first embodiment, the constituent members having the same functions as in the image forming apparatus described with reference to FIG. 1 are denoted by the same reference numerals.

In the process cartridge of the present invention, at least the charging means, the developing means and the image bearing member are integrated into a cartridge, and this process cartridge is provided detachably in the main body of the image forming apparatus (e.g., a copying machine, a laser beam printer or a facsimile machine).

In this embodiment, exemplified is a process cartridge 9 in which a developing means 8, a drum-type image bearing member (a photosensitive drum) 1, a cleaning means 6 having a cleaning blade 60 and a charging means (a magnetic brush charging assembly) 2 are joined into one unit.

In this embodiment, the developing means 8 has an elastic blade 82 and a magnetic toner 81 in a developer container 80. At the time of development, a given electric field is formed across the photosensitive drum 1 and the developing sleeve 84 by applying a development bias voltage from a bias applying means, to carry out the developing step by the use of the magnetic toner 81. In order to preferably carried out this developing step, the distance between the photosensitive drum 1 and the developing sleeve 84 is very important.

In the above embodiment, explained is a process cartridge in which the four constituents, the developing means, the image bearing member, the cleaning means and the charging means are joined into one unit. In the present invention, however, the embodiment is a process cartridge comprising at least three constituents, the charging means, the developing means and the image bearing member joined into one unit. Thus, the cleaning means may be provided in the main body of the image forming apparatus, and accordingly the process cartridge may not necessarily contain the cleaning means. It is also possible to add other constituent(s) so as to be joined together into one unit as a cartridge.

Figure 5:
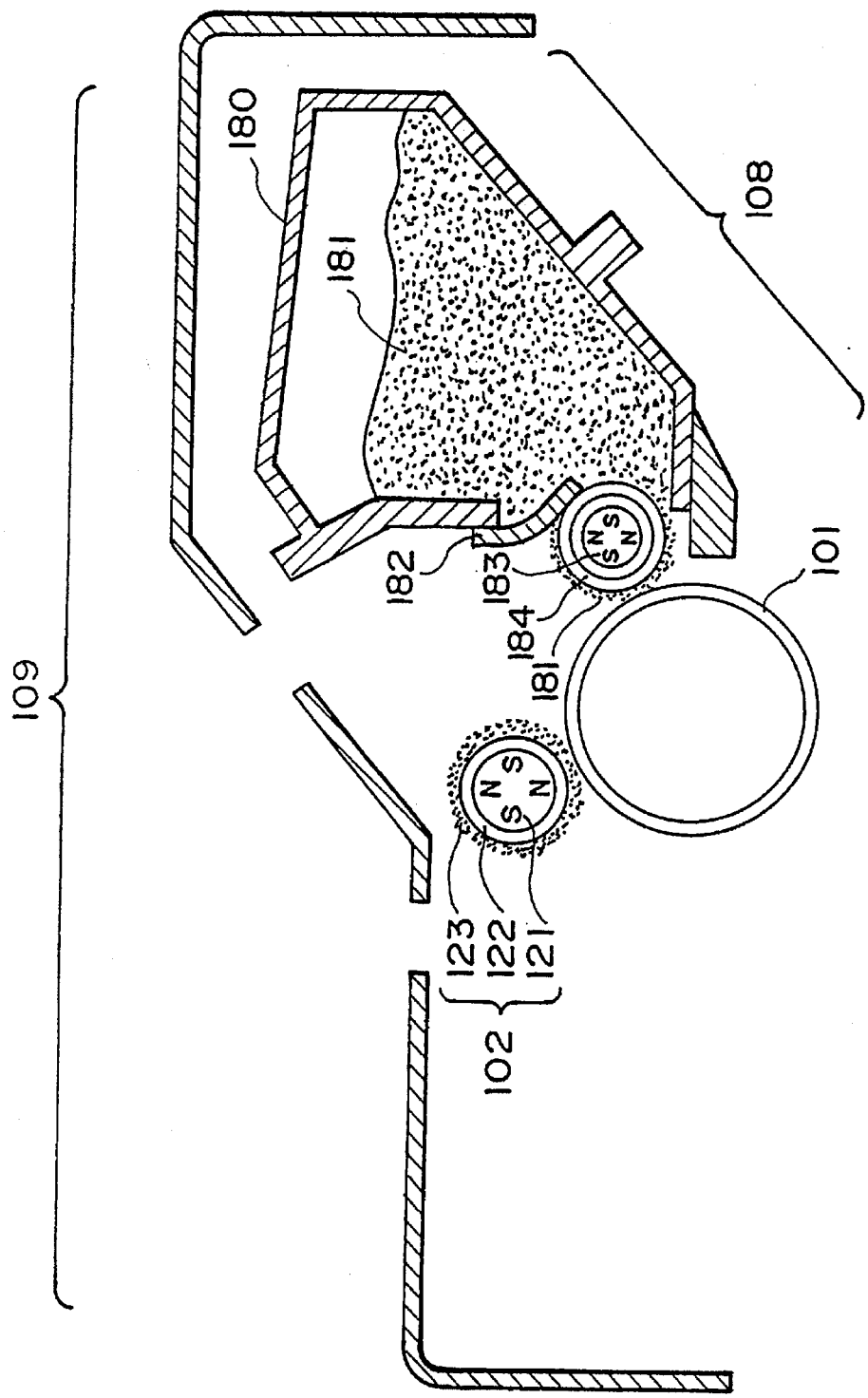
FIG. 5 schematically illustrates a process cartridge according to a second embodiment of the present invention.
Figure 6:
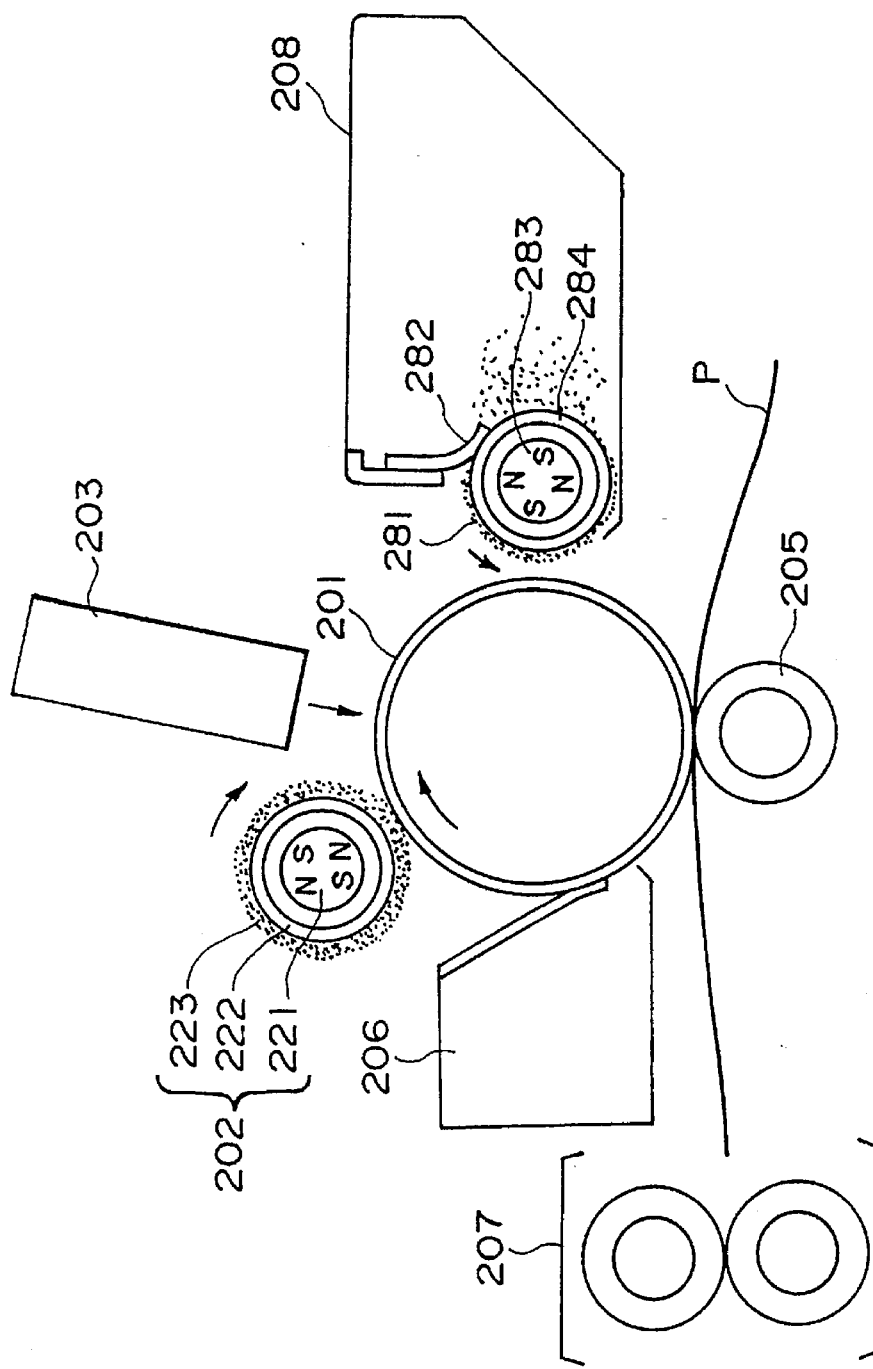
FIG. 6 schematically illustrates a conventional image forming apparatus.

FIG. 5 illustrates a process cartridge according to a second embodiment of the present invention. In the description of this process cartridge according to the second embodiment, the constituent members having the same functions as in the image forming apparatus described with reference to FIG. 3 are denoted by the same reference numerals.

In the process cartridge according to the second embodiment of the present invention, exemplified is a process cartridge 109 in which a developing means 108, a drum-type image bearing member (a photosensitive drum) 101 and a charging means (a magnetic brush charging assembly) 102 are joined into one unit. That is, this process cartridge has the cleanerless constitution where the developing means 108 collects the magnetic toner remaining after the transfer, and carries out the development at the same time.

As described above, according to the present invention, by using a magnetic toner having σ.D.δ of 150 or less, which is an index of the magnetic binding force of magnetic toners, the toner is immediately collected in and unloaded from the magnetic brush charging assembly, preventing the accumulation of the magnetic toner migrated from the image bearing member and entered the magnetic brush. Thus, the problem of faulty charging that is caused by the accumulation of the magnetic toners can be settled and no faulty images result.

EXAMPLES

Examples 1

As the image forming apparatus of the first embodiment as shown in FIG. 1, the following magnetic brush charging assembly, photosensitive drum and magnetic toner were used, and images were formed on 5,000 sheets under the following bias conditions to allow evaluation of the images. Results of the evaluation are shown in Table 1.

Magnetic Brush Charging Assembly

In the magnetic brush charging assembly, as the conductive magnetic particles used were ferrite particles with an average particle diameter of 15 μm, a volume resistivity of $1\times10^6$ Ω.cm and a saturation magnetization of 58 Am$^2$/kg in a magnetic field of 1K oersted. The diameter of the magnetic roll of the magnetic brush charging assembly is 13.9 mm and the number of the magnetic poles of the magnetic roll is 4, and the peak of the magnetic force is set at an angle of 4° in the rotational direction of the photosensitive drum, measuring from the line connecting the centers of the photosensitive drum and the magnetic brush charging assembly. The strength of the magnetic force on the surface of the magnetic brush charging assembly was 850 gauss. As the charging bias, a voltage produced by superimposing on a DC voltage of −700 V a rectangular wave AC voltage with a frequency of 1 kHz and a peak-to-peak voltage of 600 Vpp was applied and the photosensitive drum was charged to −700 V by the sleeve of the magnetic brush charging assembly rotating in the arrow direction at a peripheral speed of 100 mm/sec.

Photosensitive Drum

On the surface of an OPC drum comprising an aluminum substrate and a subbing layer, a positive charge injection blocking layer, a charge generation layer and a charge transport layer superposed in this order, a charge injection layer was provided by applying a dispersion prepared by dispersing 60 parts by weight of ultrafine $SnO_2$ particles with an average particle diameter of 0.03 μm as a conductive fine particles in 100 parts by weight of a photo-curable acrylic resin. The photosensitive drum was rotated in the arrow direction at a peripheral speed of 100 mm/sec.

Magnetic Toner

Thirty parts by weight of magnetite having a magnetization quantity of 60 Am$^2$/kg in a magnetic field of 1K oersted and 100 parts by weight of a styrene-acrylic resin were melt-kneaded, followed by pulverization and classification to obtain magnetic toner particles having the magnetization quantity σ, weight average particle diameter D and density δ as shown in Table 1. One hundred parts by weight of the magnetic toner particles and 0.8 part by weight of the hydrophobic fine silica powder were mixed to prepare the magnetic toner. The volume resistivity of the magnetic toner was $10^{14}$ Ω.cm or more.

As the development bias, a voltage produced by superimposing on a DC voltage of −500 V a rectangular wave AC voltage with a frequency of 2 kHz and a peak-to-peak voltage of 1.6 kV was applied.

In the image evaluation in the present Example 1, the charging ghost is an evaluation item to judge the charging performance after exposure of the photosensitive member from the formed image. If the charging performance becomes poor, the charge potential at the exposed area in the previous cycle becomes lower than that at the unexposed area, so that a ghost appears in the image. Thus, this ghost phenomenon was observed through the running test, and the images were evaluated according to the following evaluation criteria.

(Evaluation Criteria)

AA: No ghost is seen in white solid areas and halftone areas, showing good results.

A: Ghost is not seen in white solid areas but slightly seen in halftone areas.

B: Ghost is not seen in white solid areas but clearly seen in halftone areas.

C: Ghost is seen in both white solid areas and halftone areas.

Example 2

A magnetic toner having properties as shown in Table 1 was produced in the same manner as in Example 1 except that the content of the magnetite in the magnetic toner was changed to 15 parts by weight. Images were formed and evaluated in the same manner as in Example 1. Results of the evaluation are shown in Table 1.

Example 3

A magnetic toner was obtained in the same manner as in Example 1 except that the magnetite used therein was replaced with 30 parts by weight of a magnetite doped with Mn in a large quantity, having a magnetization quantity of 30 Am$^2$/kg in a magnetic field of 1K oersted. Images were formed and evaluated in the same manner as in Example 1. Results of the evaluation are shown in Table 1.

Example 4

A magnetic toner was obtained in the same manner as in Example 1 except that the magnetite used therein was replaced with 30 parts by weight of nickel ferrite having a magnetization quantity of 70 Am$^2$/kg in a magnetic field of 1K oersted. Images were formed and evaluated in the same manner as in Example 1.

Results of the evaluation are shown in Table 1.

Example 5

In the production of the magnetic toner used in Example 1, pulverization and classification conditions were changed to obtain a magnetic toner with a weight average particle diameter of 8.2 μm. Images were formed and evaluated in the same manner as in Example 1.

Results of the evaluation are shown in Table 1.

Example 6

A magnetic toner was obtained in the same manner as in Example 1 except that the magnetite used therein was replaced with 100 parts by weight of a magnetite doped with Mn in a large quantity, having a magnetization quantity of 30 $Am^2/kg$ in a magnetic field of 1K oersted. Images were formed and evaluated in the same manner as in Example 1.

Results of the evaluation are shown in Table 1.

Comparative Example 1

A magnetic toner having properties as shown in Table 1 was obtained in the same manner as in Example 1 except that the content of the magnetite in the magnetic toner used therein was changed to 100 parts by weight. Images were formed and evaluated in the same manner as in Example 1. Results of the evaluation are shown in Table 1.

Comparative Example 2

A magnetic toner was obtained in the same manner as in Example 1 except that the magnetite used therein was replaced with 100 parts by weight of nickel ferrite having a magnetization quantity of 70 $Am^2/kg$ in a magnetic field of 1K oersted. Images were formed and evaluated in the same manner as in Example 1.

Results of the evaluation are shown in Table 1.

Comparative Example 3

A magnetic toner was obtained in the same manner as in Example 1 except that the magnetite used therein was replaced with 200 parts by weight of magnetite doped with a large quantity of Mn, having a magnetization quantity of 30 $Am^2/kg$ in a magnetic field of 1K oersted. Images were formed and evaluated in the same manner as in Example 1.

Results of the evaluation are shown in Table 1.

Comparative Example 4

In the production of the magnetic toner used in Example 1, pulverization and classification conditions were changed to obtain a magnetic toner with a weight average particle diameter of 9.0 μm. Images were formed and evaluated in the same manner as in Example 1. Ghost phenomenon was worsened and minuteness of the image was lessened because of the large toner diameter.

Results of the evaluation are shown in Table 1.

Example 7

Images were formed and evaluated in the same manner as in Example 1 except that the charging bias applied therein was a DC voltage of −700 V. As a result, although ghost phenomenon was a little worsened compared with Example 1, it was possible to obtain images comparable to those in Example 1.

TABLE 1

| | | Toner | | Charging ghost, image evaluation | | | |
|---|---|---|---|---|---|---|---|
| | Material: content (pbw) | Production process | $\sigma \cdot D \cdot \delta$ | Initial stage | After 1,000 sh. | After 2,000 sh. | After 5,000 sh. |
| Example: | | | | | | | |
| 1 | Resin: 100 Magnetite: 30 | Pulverization | 108 $\sigma = 15$ $D = 6$ $\delta = 1.2$ | AA | AA | A | A |
| 2 | Resin: 100 Magnetite: 15 | Pulverization | 46 $\sigma = 7$ $D = 6$ $\delta = 1.1$ | AA | AA | A | B |
| 3 | Resin: 100 Mn-doped magnetite: 30 | Pulverization | 72 $\sigma = 10$ $D = 6$ $\delta = 1.2$ | AA | AA | A | A |
| 4 | Resin: 100 Nichekl ferrite: 70 | Pulverization | 145 $\sigma = 20$ $D = 5$ | AA | A | A | B |
| 5 | Resin: 100 Magnetite: 30 | Pulverization | 147.6 $\sigma = 20$ $D = 8.2$ $\delta = 1.2$ | AA | AA | A | B |
| 6 | Resin: 100 Mn-doped magnetite: 100 | Pulverization | 144 $\sigma = 15$ $D = 6$ $\delta = 1.6$ | AA | A | A | B |
| Comparative Example: | | | | | | | |
| 1 | Resin: 100 Magnetite: 100 | Pulverization | 288 $\sigma = 30$ $D = 6$ $\delta = 1.6$ | AA | A | B | C |
| 2 | Resin: 100 Nickel ferrite: 100 | Pulverization | 384 $\sigma = 40$ | A | B | C | C |

TABLE 1-continued

| | Toner | | | Charging ghost, image evaluation | | | |
|---|---|---|---|---|---|---|---|
| | Material: content (pbw) | Production process | σ · D · δ | Initial stage | After 1,000 sh. | After 2,000 sh. | After 5,000 sh. |
| 3 | Resin: 100 Mn-doped magnetite: 200 | Pulverization | D = 6<br>δ = 1.6<br>360<br>σ = 30<br>D = 6 | A | B | C | C |
| 4 | Resin: 100 Magnetite: 15 | Pulverization | δ = 2.0<br>162<br>σ = 15<br>D = 9.0<br>δ = 1.2 | AA | AA | B | C |

Example 8

In the image forming apparatus of the second embodiment as shown in FIG. 3, the same magnetic brush charging assembly and photosensitive drum as used in Example 1 and the following magnetic toner were used, and images were formed on 5,000 sheets to make evaluation of the images. Results of the evaluation are shown in Table 2.

Magnetic Toner

Thirty parts by weight of a magnetite with a magnetization quantity of 60 $Am^2/kg$ in a magnetic field of 1K oersted and 100 parts by weight of a styrene-acrylic resin were melt-kneaded, followed by pulverization and classification, and heat treatment to obtain a spherical magnetic toner having the magnetization quantity σ, weight average particle diameter D, density δ and SF-1, SF-2 as shown in Table 2.

As the development bias, a voltage produced by superimposing on a DC voltage of −400 V a rectangular wave AC voltage with a frequency of 2 kHz and a peak-to-peak voltage of 1.6 kV was applied. In the cleanerless constitution, the magnetic toner remaining after the transfer is collected by the developing means simultaneously during the development.

In the image evaluation in the present Example 8, ghost phenomenon was evaluated in the same manner as in Example 1.

Example 9

A spherical magnetic toner having physical properties as shown in Table 2 was produced in the same manner as in Example 8 except that the content of the magnetite in the spherical magnetic toner used therein was changed to 15 parts by weight. Images were formed and evaluated in the same manner as in Example 8.

Results of the evaluation are shown in Table 2.

Example 10

A spherical magnetic toner having physical properties as shown in Table 2 was produced in the same manner as in Example 8 except that the heating treatment to obtain a spherical magnetic toner was not carried out. Images were formed and evaluated in the same manner as in Example 8.

Results of the evaluation are shown in Table 2.

Example 11

A magnetic toner was obtained in the same manner as in Example 8 except that the magnetite used therein was replaced with 30 parts by weight of a magnetite doped with a large quantity of Mn having a magnetization quantity of 30 $Am^2/kg$ in a magnetic field of 1K oersted. Images were formed and evaluated in the same manner as in Example 8.

Results of the evaluation are shown in Table 2.

Example 12

A magnetic toner was obtained in the same manner as in Example 8 except that the magnetite used therein was replaced with 30 parts by weight of nickel ferrite having a magnetization quantity of 70 $Am^2/kg$ in a magnetic field of 1K oersted. Images were formed and evaluated in the same manner as in Example 8.

Results of the evaluation are shown in Table 2.

Example 13

In the production of the magnetic toner used in Example 8, pulverization and classification conditions were changed to obtain a magnetic toner with a weight average particle diameter of 8.1 μm. Images were formed and evaluated in the same manner as in Example 8.

Results of the evaluation are shown in Table 2.

Example 14

A magnetic toner was obtained in the same manner as in Example 8 except that the magnetite used therein was replaced with 100 parts by weight of a magnetite doped with a large quantity of Mn, having a magnetization quantity of 30 $Am^2/kg$ in a magnetic field of 1K oersted. Images were formed and evaluated in the same manner as in Example 8.

Results of the evaluation are shown in Table 2.

Comparative Example 5

A spherical magnetic toner having physical properties as shown in Table 2 was produced in the same manner as in Example 8 except that the content of the magnetite in the spherical magnetic toner used therein was changed to 100 parts by weight. Images were formed and evaluated in the same manner as in Example 8.

Results of the evaluation are shown in Table 2.

Comparative Example 6

A magnetic toner was obtained in the same manner as in Example 8 except that the magnetite used therein was replaced with 100 parts by weight of nickel ferrite having a magnetization quantity of 70 $Am^2/kg$ in a magnetic field of 1K oersted. Images were formed and evaluated in the same manner as in Example 8.

Results of the evaluation are shown in Table 2.

Comparative Example 7

A magnetic toner was obtained in the same manner as in Example 8 except that the magnetite used therein was replaced with 200 parts by weight of a magnetite doped with a large quantity of Mn, having a magnetization quantity of 30 $Am^2/kg$ in a magnetic field of 1K oersted. Images were formed and evaluated in the same manner as in Example 8.

Results of the evaluation are shown in Table 2.

Comparative Example 8

In the production of the magnetic toner used in Example 8, pulverization and classification conditions were changed to obtain a magnetic toner with a weight average particle diameter of 8.9 μm. Images were formed and evaluated in the same manner as in Example 8.

Results of the evaluation are shown in Table 2.

Example 15

Images were formed and evaluated in the same manner as in Example 8 except that the charging bias applied therein was replaced with only a DC voltage of $-700$ V. As a result, although ghost phenomenon was observed after running on a small number of sheets compared with Example 8, it did not lower to the level "C".

TABLE 2

| | Toner | | | | | Charging ghost, image evaluation | | | |
|---|---|---|---|---|---|---|---|---|---|
| | Material: content (pbw) | Production process | $\sigma \cdot D \cdot \delta$ | SF-1 | SF-2 | Initial stage | After 1,000 sheets | After 2,000 sheets | After 5,000 sheets |
| Example: | | | | | | | | | |
| 8 | Resin: 100 Magnetite: 30 | Pulverization & heat treatment | 108 $\sigma = 15$ $D = 6$ $\delta = 1.2$ | 140 | 125 | AA | AA | A | A |
| 9 | Resin: 100 Magnetite: 15 | Pulverization & heat treatment | 46 $\sigma = 7$ $D = 6$ $\delta = 1.1$ | 140 | 125 | AA | AA | A | B |
| 10 | Resin: 100 Magnetite: 30 | Pulverizaqtion | 108 $\sigma = 15$ $D = 6$ $\delta = 1.2$ | 155 | 145 | AA | A | B | B |
| 11 | Resin: 100 Mn-doped magnetite: 30 | Pulverization & heat treatment | 72 $\sigma = 10$ $D = 6$ $\delta = 1.2$ | 140 | 125 | AA | AA | A | A |
| 12 | Resin: 100 Nickel ferrite: 70 | Pulverization & heat treatment | 145 $\sigma = 20$ $D = 5$ $\delta = 1.45$ | 140 | 125 | AA | A | A | B |
| 13 | Resin: 100 Magnetite: 30 | Pulverization & heat treatment | 145.8 $\sigma = 15$ $D = 8.1$ $\delta = 1.2$ | 140 | 125 | AA | AA | A | B |
| 14 | Resin: 100 Mn-doped magnetite: 100 | Pulverization & heat treatment | 144 $\sigma = 15$ $D = 6$ $\delta = 1.6$ | 140 | 125 | AA | A | A | B |
| Comparative Example | | | | | | | | | |
| 5 | Resin: 100 Magnetite: 100 | Pulverization & heat treatment | 288 $\sigma = 30$ $D = 6$ $\delta = 1.6$ | 140 | 125 | AA | B | C | C |
| 6 | Resin: 100 Nickel ferrite: 100 | Pulverization & heat treatment | 384 $\sigma = 40$ $D = 6$ $\delta = 1.6$ | 140 | 125 | A | A | B | C |
| 7 | Resin: 100 Mn-doped magnetite: 200 | Pulverization & heat treatment | 360 $\sigma = 30$ $D = 6$ $\delta = 2.0$ | 140 | 125 | A | B | C | C |
| 8 | Resin: 100 Magnetite: 15 | Pulverization & heat treatment | 160.2 $\sigma = 15$ $D = 8.9$ $\delta = 1.2$ | 140 | 125 | AA | A | B | C |

*Heat treatment for spheration

What is claimed is:

1. An image forming method comprising the steps of:
   electrostatically charging an image bearing member by a charging means;
   forming an electrostatic latent image on the image bearing member charged in said charging step, by a latent image forming means;
   developing the electrostatic latent image with a magnetic toner to form a toner image; and
   transferring the toner image to a transfer medium,
   wherein the charging means comprises a magnetic brush charging assembly having a magnetic brush formed from conductive magnetic particles magnetically bound, the magnetic brush charging assembly coming into contact with the image bearing member and being capable of electrostatically charging the surface of the image bearing member by directly injecting charges into the surface of the image bearing member, and
   wherein the magnetic toner has a value of $\sigma.D.\delta$ of 150 or less, the value being obtained by multiplying (i) a magnetization quantity $\sigma$ ($Am^2/kg$) in a magnetic field of 1K oersted as measured by a vibration magnetometer, (ii) a weight average particle diameter D ($\mu m$) of the magnetic toner and (iii) a density $\delta$ ($g/cm^3$) thereof.

2. The image forming method according to claim 1, wherein said magnetic toner has a value of $\sigma.D.\delta$ within the range of from 50 to 150.

3. The image forming method according to claim 1, wherein said magnetic toner has a value of $\sigma.D.\delta$ within the range of from 100 to 130.

4. The image forming method according to claim 1, wherein said magnetic toner has a magnetization quantity of from 10 $Am^2/kg$ to 30 $Am^2/kg$.

5. The image forming method according to claim 1, wherein said magnetic toner has a magnetization quantity of from 10 $Am^2/kg$ to 20 $Am^2/kg$.

6. The image forming method according to claim 1, wherein said magnetic toner has a weight average particle diameter of from 2 $\mu m$ to 20 $\mu m$.

7. The image forming method according to claim 1, wherein said magnetic toner has a weight average particle diameter of from 4 $\mu m$ to 8 $\mu m$.

8. The image forming method according to claim 1, wherein said magnetic toner has a density of from 1.1 to 2.0.

9. The image forming method according to claim 1, wherein said magnetic toner has a density of from 1.1 to 1.6.

10. The image forming method according to claim 1, wherein said magnetic toner has a volume resistivity of $10^9$ $\Omega.cm$ or above.

11. The image forming method according to claim 1, wherein said magnetic toner has a volume resistivity of $10^{10}$ $\Omega.cm$ or more.

12. The image forming method according to claim 1, wherein said magnetic toner is a spherical magnetic toner.

13. The image forming method according to claim 12, wherein said spherical magnetic toner has a shape coefficient SF-1 of from 100 to 150 and SF-2 of from 100 to 130.

14. The image forming method according to claim 12, wherein said spherical magnetic toner has a shape coefficient SF-1 of from 100 to 145 and SF-2 of from 100 to 125.

15. The image forming method according to claim 1, wherein said image bearing member comprises an organic photoconductor having a charge injection layer.

16. The image forming method according to claim 15, wherein said charge injection layer comprises a resin layer containing conductive fine particles dispersed therein.

17. The image forming method according to claim 16, wherein said conductive fine particles are contained in said charge injection layer in an amount of from 20 parts by weight to 100 parts by weight based on 100 parts by weight of the resin.

18. The image forming method according to claim 16, wherein said conductive fine particles contain at least one member selected from the group consisting of $SnO_2$, $TiO_2$ and ITO.

19. The image forming method according to claim 16, wherein said resin layer is formed of at least one member selected from the group consisting of acrylic resin, polycarbonate, polyester, polyethylene terephthalate and polystyrene.

20. The image forming method according to claim 16, wherein said charge injection layer has a volume resistivity of $1 \times 10^8$ $\Omega.cm$ or above.

21. The image forming method according to claim 1, wherein said conductive magnetic particles contain single-component crystals or mixed crystals of a conductive metal or metals.

22. The image forming method according to claim 1, wherein said conductive magnetic particles comprise particles containing a particulate conductive magnetic material dispersed in a binder polymer.

23. The image forming method according to claim 1, wherein the surface of said conductive magnetic particles are coated with a resin containing a conductive agent.

24. The image forming method according to claim 1, wherein said conductive magnetic particles have an average particle diameter of from 1 $\mu m$ to 100 $\mu m$.

25. The image forming method according to claim 1, wherein said conductive magnetic particles have an average particle diameter of from 5 $\mu m$ to 50 $\mu m$.

26. The image forming method according to claim 1, wherein said conductive magnetic particles have a volume resistivity of $10^{10}$ $\Omega.cm$ or below.

27. The image forming method according to claim 1, wherein said conductive magnetic particles have a volume resistivity of $10^6$ $\Omega.cm$ to $10^9$ $\Omega.cm$.

28. The image forming method according to claim 1, wherein said conductive magnetic particles have a saturation magnetization of 30 $Am^2/kg$ or above.

29. The image forming method according to claim 1, wherein said conductive magnetic particles have a saturation magnetization of from 40 $Am^2/kg$ to 300 $Am^2/kg$.

30. The image forming method according to claim 1, wherein said image bearing member is charged by applying a direct current voltage to said magnetic brush charging assembly.

31. The image forming method according to claim 1, wherein said image bearing member is charged by applying a voltage produced by superimposing an alternating current voltage on a direct current voltage, to said magnetic brush charging assembly.

32. The image forming method according to claim 1, wherein said transfer medium to which the toner image is transferred is a final transfer medium.

33. The image forming method according to claim 1, wherein said transfer medium to which the toner image is transferred is an intermediate transfer medium.

34. The image forming method according to claim 33, wherein the toner image transferred to said intermediate transfer medium is again transferred to a final transfer medium.

35. The image forming method according to claim 1, wherein the magnetic toner having remained on said image bearing member after the transfer is removed by a cleaning means provided between the transfer zone and the charging zone, and the magnetic toner partly not removed by the cleaning means enters said magnetic brush charging assembly and thereafter is unloaded from the magnetic brush charging assembly.

36. The image forming method according to claim 1, wherein the magnetic toner remained on said image bearing member after the transfer enters said magnetic brush charging assembly and thereafter is unloaded from the magnetic brush charging assembly, and the magnetic toner thus unloaded is simultaneously removed during development by a developing means that develops the electrostatic latent image on the image bearing member with the magnetic toner.

37. The image forming method according to claim 36, wherein said magnetic toner is a spherical magnetic toner.

38. The image forming method according to claim 37, wherein said spherical magnetic toner has a shape coefficient SF-1 of from 100 to 150 and SF-2 of from 100 to 130.

39. The image forming method according to claim 37, wherein said spherical magnetic toner has a shape coefficient SF-1 of from 100 to 145 and SF-2 of from 100 to 125.

40. The image forming method according to claim 1, wherein the magnetic brush charging assembly comprises a non-magnetic sleeve, a magnet roll provided inside the non-magnetic sleeve and conductive magnetic particles magnetically bound to a surface of the non-magnetic sleeve.

41. The image forming method according to claim 40, wherein the magnetic brush charging assembly has a magnetic strength of 400–1500 gauss on the non-magnetic sleeve surface.

42. The image forming method according to claim 40, wherein the magnetic brush charging assembly has a magnetic strength of 600–1300 gauss on the non-magnetic sleeve surface.

43. The image forming method according to claim 40, wherein the magnet roll has two or more magnetic poles.

44. The image forming method according to claim 40, wherein the image bearing member comprises a photosensitive drum, and magnetic poles of the magnet roll are set in the magnetic brush charging assembly so that a peak of a magnetic force may be present within an angle of 20°, in a rotation direction of the photosensitive drum, measuring from a line connecting centers of the photosensitive drum and the magnetic brush charging assembly.

45. The image forming method according to claim 40, wherein the image-bearing member comprises a photosensitive drum, and magnetic poles of the magnet roll are set in the magnetic brush charging assembly so that a peak of a magnetic force may be present within an angle of 10°, in a rotation direction of the photosensitive drum, measuring from a line connecting centers of the photosensitive drum and the magnetic brush charging assembly.

46. The image forming method according to claim 40, wherein the image bearing member comprises a photosensitive drum, and the magnetic brush charging assembly rotates in a same direction as the photosensitive drum.

47. The image forming method according to claim 46, wherein rotation of the magnetic brush charging assembly is achieved by fixing the magnet roll and rotating the non-magnetic sleeve.

48. The image forming method according to claim 46, wherein the photosensitive drum and the magnetic brush charging assembly rotate at a same peripheral speed.

49. An image forming apparatus comprising:
an image bearing member for bearing an electrostatic latent image;
a charging means for electrostatically charging said image bearing member;
a latent image forming means for forming an electrostatic latent image on said charged image bearing member;
a developing means for rendering the electrostatic latent image visible by development with a magnetic toner to form a toner image; and
a transfer means for transferring the toner image to a transfer medium, wherein said charging means comprises a magnetic brush charging assembly having a magnetic brush formed of conductive magnetic particles magnetically bound, said magnetic brush charging assembly coming into contact with the image bearing member and being capable of electrostatically charging the surface of said image bearing member by directly injecting charges into the surface of said image bearing member, and wherein said magnetic toner has a value of $\sigma.D.\delta$ of 150 or less, said value being obtained by multiplying i) a magnetization quantity $\sigma$ ($Am^2/kg$) in a magnetic field of 1K oersted as measured by a vibration magnetometer, ii) a weight average particle diameter D ($\mu m$) of the magnetic toner and (iii) a density $\delta$ ($g/cm^3$) thereof.

50. The image forming apparatus according to claim 49, wherein said magnetic toner has a value of $\sigma.D.\delta$ within the range of from 50 to 150.

51. The image forming apparatus according to claim 49, wherein said magnetic toner has a value of $\sigma.D.\delta$ within the range of from 100 to 130.

52. The image forming apparatus according to claim 49, wherein said magnetic toner has a magnetization quantity of from 10 $Am^2/kg$ to 30 $Am^2/kg$.

53. The image forming apparatus according to claim 49, wherein said magnetic toner has a magnetization quantity of from 10 $Am^2/kg$ to 20 $Am^2/kg$.

54. The image forming apparatus according to claim 49, wherein said magnetic toner has a weight average particle diameter of from 2 $\mu m$ to 20 $\mu m$.

55. The image forming apparatus according to claim 49, wherein said magnetic toner has a weight average particle diameter of from 4 $\mu m$ to 8 $\mu m$.

56. The image forming apparatus according to claim 49, wherein said magnetic toner has a density of from 1.1 to 2.0.

57. The image forming apparatus according to claim 49, wherein said magnetic toner has a density of from 1.1 to 1.6.

58. The image forming apparatus according to claim 49, wherein said magnetic toner has a volume resistivity of $10^9$ $\Omega.cm$ or above.

59. The image forming apparatus according to claim 49, wherein said magnetic toner has a volume resistivity of $10^{10}$ $\Omega.cm$ or more.

60. The image forming apparatus according to claim 49, wherein said magnetic toner is a spherical magnetic toner.

61. The image forming apparatus according to claim 60, wherein said spherical magnetic toner has a shape coefficient SF-1 of from 100 to 150 and SF-2 of from 100 to 130.

62. The image forming apparatus according to claim 60, wherein said spherical magnetic toner has a shape coefficient SF-1 of from 100 to 145 and SF-2 of from 100 to 125.

63. The image forming apparatus according to claim 49, wherein said image bearing member comprises an organic photoconductor having a charge injection layer.

64. The image forming apparatus according to claim 63, wherein said charge injection layer comprises a resin layer containing conductive fine particles dispersed therein.

65. The image forming apparatus according to claim 64, wherein said conductive fine particles are contained in said charge injection layer in an amount of from 20 parts by weight to 100 parts by weight based on 100 parts by weight of the resin.

66. The image forming apparatus according to claim 64, wherein said conductive fine particles contain at least one member selected from the group consisting of $SnO_2$, $TiO_2$ and ITO.

67. The image forming apparatus according to claim 64, wherein said resin layer is formed of at least one member selected from the group consisting of acrylic resin, polycarbonate, polyester, polyethylene terephthalate and polystyrene.

68. The image forming apparatus according to claim 64, wherein said charge injection layer has a volume resistivity of $1 \times 10^8$ $\Omega$.cm or above.

69. The image forming apparatus according to claim 49, wherein said conductive magnetic particles contain single-component crystals or mixed crystals of a conductive metal or metals.

70. The image forming apparatus according to claim 49, wherein said conductive magnetic particles containing a particulate conductive magnetic material dispersed in a binder polymer.

71. The image forming apparatus according to claim 49, wherein the surface of said conductive magnetic particles are coated with a resin containing a conductive agent.

72. The image forming apparatus according to claim 49, wherein said conductive magnetic particles have an average particle diameter of from 1 µm to 100 µm.

73. The image forming apparatus according to claim 49, wherein said conductive magnetic particles have an average particle diameter of from 5 µm to 50 µm.

74. The image forming apparatus according to claim 49, wherein said conductive magnetic particles have a volume resistivity of $10^{10}$ $\Omega$.cm or below.

75. The image forming apparatus according to claim 49, wherein said conductive magnetic particles have a volume resistivity of $10^6$ $\Omega$.cm to $10^9$ $\Omega$.cm.

76. The image forming apparatus according to claim 49, wherein said conductive magnetic particles have a saturation magnetization of 30 $Am^2/kg$ or above.

77. The image forming apparatus according to claim 49, wherein said conductive magnetic particles have a saturation magnetization of from 40 $Am^2/kg$ to 300 $Am^2/kg$.

78. The image forming apparatus according to claim 49, wherein said magnetic brush charging assembly charges said image bearing member by applying a direct current.

79. The image forming apparatus according to claim 49, wherein said magnetic brush charging assembly charges said image bearing member by applying a voltage produced by superimposing an alternating current voltage on a direct current voltage.

80. The image forming apparatus according to claim 49, wherein said transfer medium to which the toner image is transferred is a final transfer medium.

81. The image forming apparatus according to claim 49, wherein said transfer medium to which the toner image is transferred is an intermediate transfer medium.

82. The image forming apparatus according to claim 81, wherein the toner image transferred to said intermediate transfer medium is again transferred to final transfer medium.

83. The image forming apparatus according to claim 49, wherein a cleaning means for removing the magnetic toner having remained on said image bearing member after the transfer is provided between the transfer zone and the charging zone, and the magnetic toner partly not removed by the cleaning means enters said magnetic brush charging assembly and thereafter is unloaded from the magnetic brush charging assembly.

84. The image forming apparatus according to claim 49, wherein said developing means develops the electrostatic latent image on the image bearing member by the aid of the magnetic toner and simultaneously remove the magnetic toner having remained on the image bearing member after the transfer, the magnetic toner having remained on the image bearing member after transfer enters said magnetic brush charging assembly and thereafter is unloaded from the magnetic brush charging assembly, and the magnetic toner thus unloaded is removed by said developing means.

85. The image forming apparatus according to claim 84, wherein said magnetic toner is a spherical magnetic toner.

86. The image forming apparatus according to claim 85, wherein said spherical magnetic toner has a shape coefficient SF-1 of from 100 to 150 and SF-2 of from 100 to 130.

87. The image forming apparatus according to claim 85, wherein said spherical magnetic toner has a shape coefficient SF-1 of from 100 to 145 and SF-2 of from 100 to 125.

88. A process cartridge detachably mountable to a main assembly of an image forming apparatus, said process cartridge comprising:

an image bearing member for bearing an electrostatic latent image;

a charging means for electrostatically charging said image bearing member; and a developing means for rendering visible the electrostatic latent image held on said image bearing member, by development to form a toner image, wherein the charging means comprises a magnetic brush charging assembly having a magnetic brush formed of conductive magnetic particles magnetically bound, said magnetic brush charging assembly coming into contact with the image bearing member and being capable of electrostatically charging the surface of said image bearing member by directly injecting charges into the surface of said image bearing member, and wherein the magnetic toner has a value of $\sigma.D.\delta$ of 150 or less, said value being obtained by multiplying i) a magnetization quantity $\sigma$ ($Am^2/kg$) in a magnetic field of 1K oersted as measured by a vibration magnetometer, ii) a weight average particle diameter D (µm) of the magnetic toner and (iii) a density $\delta$ ($g/cm^3$) thereof.

89. The process cartridge according to claim 88, wherein said magnetic toner has a value of $\sigma.D.\delta$ within the range of from 50 to 150.

90. The process cartridge according to claim 88, wherein said magnetic toner has a value of $\sigma.D.\delta$ within the range of from 100 to 130.

91. The process cartridge according to claim 88, wherein said magnetic toner has a magnetization quantity of from 10 $Am^2/kg$ to 30 $Am^2/kg$.

92. The process cartridge according to claim 88, wherein said magnetic toner has a magnetization quantity of from 10 $Am^2/kg$ to 20 $Am^2/kg$.

93. The process cartridge according to claim 88, wherein said magnetic toner has a weight average particle diameter of from 2 µm to 20 µm.

94. The process cartridge according to claim 88, wherein said magnetic toner has a weight average particle diameter of from 4 µm to 8 µm.

95. The process cartridge according to claim 88, wherein said magnetic toner has a density of from 1.1 to 2.0.

96. The process cartridge according to claim 88, wherein said magnetic toner has a density of from 1.1 to 1.6.

97. The process cartridge according to claim 88, wherein said magnetic toner has a volume resistivity of $10^9$ $\Omega$.cm or above.

98. The process cartridge according to claim 88, wherein said magnetic toner has a volume resistivity of $10^{10}$ $\Omega$.cm or more.

99. The process cartridge according to claim 88, wherein said magnetic toner is a spherical magnetic toner.

100. The process cartridge according to claim 99, wherein said spherical magnetic toner has a shape coefficient SF-1 of from 100 to 150 and SF-2 of from 100 to 130.

101. The process cartridge according to claim 99, wherein said spherical magnetic toner has a shape coefficient SF-1 of from 100 to 145 and SF-2 of from 100 to 125.

102. The process cartridge according to claim 88, wherein said image bearing member comprises an organic photoconductor having a charge injection layer.

103. The process cartridge according to claim 102, wherein said charge injection layer comprises a resin layer containing conductive fine particles dispersed therein.

104. The process cartridge according to claim 103, wherein said conductive fine particles are contained in said charge injection layer in an amount of from 20 parts by weight to 100 parts by weight based on 100 parts by weight of the resin.

105. The process cartridge according to claim 103, wherein said conductive fine particles contain at least one member selected from the group consisting of $SnO_2$, $TiO_2$ and ITO.

106. The process cartridge according to claim 103, wherein said resin layer is formed of at least one member selected from the group consisting of acrylic resin, polycarbonate, polyester, polyethylene terephthalate and polystyrene.

107. The process cartridge according to claim 103, wherein said charge injection layer has a volume resistivity of $1 \times 10^8$ $\Omega$.cm or above.

108. The process cartridge according to claim 88, wherein said conductive magnetic particles contain single-component crystals or mixed crystals of a conductive metal or metals.

109. The process cartridge according to claim 88, wherein said conductive magnetic particles comprise a particulate conductive magnetic material dispersed in a binder polymer.

110. The process cartridge according to claim 88, wherein the surface of said conductive magnetic particles are coated with a resin containing a conductive agent.

111. The process cartridge according to claim 88, wherein said conductive magnetic particles have an average particle diameter of from 1 µm to 100 µm.

112. The process cartridge according to claim 88, wherein said conductive magnetic particles have an average particle diameter of from 5 µm to 50 µm.

113. The process cartridge according to claim 88, wherein said conductive magnetic particles have a volume resistivity of $10^{10}$ $\Omega$.cm or below.

114. The process cartridge according to claim 88, wherein said conductive magnetic particles have a volume resistivity of $10^6$ $\Omega$.cm to $10^9$ $\Omega$.cm.

115. The process cartridge according to claim 88, wherein said conductive magnetic particles have a saturation magnetization of 30 $Am^2/kg$ or above.

116. The process cartridge according to claim 88, wherein said conductive magnetic particles have a saturation magnetization of from 40 $Am^2/kg$ to 300 $Am^2/kg$.

117. The process cartridge according to claim 88, wherein a cleaning means for removing the magnetic toner remained on said image bearing member after the transfer is provided on the upstream position of said magnetic brush charging assembly, and the magnetic toner partly not removed by the cleaning means enters said magnetic brush charging assembly and thereafter is unloaded from the magnetic brush charging assembly.

118. The process cartridge according to claim 88, wherein said developing means develops the electrostatic latent image on the image bearing member with the magnetic toner and simultaneously removes the magnetic toner remaining on the image bearing member, the magnetic toner remaining on the image bearing member after the transfer enters said magnetic brush charging assembly and thereafter is unloaded from the magnetic brush charging assembly, and the magnetic toner thus unloaded is removed by said developing means.

119. The process cartridge according to claim 118, wherein said magnetic toner is a spherical magnetic toner.

120. The process cartridge according to claim 119, wherein said spherical magnetic toner has a shape coefficient SF-1 of from 100 to 150 and SF-2 of from 100 to 130.

121. The process cartridge according to claim 119, wherein said spherical magnetic toner has a shape coefficient SF-1 of from 100 to 145 and SF-2 of from 100 to 125.

122. An image forming method comprising the steps of:
electrostatically charging an image bearing member by a charging means;
forming an electrostatic latent image on the image bearing member charged in said charging step, by a latent image forming means;
developing the electrostatic latent image with a magnetic toner to form a toner image; and
transferring the toner image to a transfer medium,
wherein the charging means comprises a magnetic brush charging assembly having a magnetic brush formed from conductive magnetic particles magnetically bound, the magnetic brush charging assembly coming into contact with the image bearing member and being capable of electrostatically charging a surface of the image bearing member, and
wherein the magnetic toner has a value of σ.D.δ of 150 or less, the value being obtained by multiplying i) a magnetization quantity σ ($Am^2/kg$) in a magnetic field of 1K oersted as measured by a vibration magnetometer, ii) a weight average particle diameter D (µm) of the magnetic toner and iii) a density δ ($g/cm^3$) thereof.

123. The image forming method according to claim 122, wherein the magnetic toner has a value of σ.D.δ within a range of from 50 to 150.

124. The image forming method according to claim 122, wherein the magnetic toner has a value of σ.D.δ within a range of from 100 to 130.

125. The image forming method according to claim 122, wherein the magnetic toner has a magnetization quantity of from 10 $Am^2/kg$ to 30 $Am^2/kg$.

126. The image forming method according to claim 122, wherein the magnetic toner has a magnetization quantity of from 10 $Am^2/kg$ to 20 $Am^2/kg$.

127. The image forming method according to claim 122, wherein the magnetic toner has a weight average particle diameter of from 2 µm to 20 µm.

128. The image forming method according to claim 122, wherein the magnetic toner has a weight average particle diameter of from 4 µm to 8 µm.

129. The image forming method according to claim 122, wherein the magnetic toner has a density of from 1.1 to 2.0.

130. The image forming method according to claim 122, wherein the magnetic toner has a density of from 1.1 to 1.6.

131. The image forming method according to claim 122, wherein the magnetic toner is a spherical magnetic toner.

132. The image forming method according to claim 131, wherein the spherical magnetic toner has a shape coefficient SF-1 of from 100 to 150 and SF-2 of from 100 to 130.

133. The image forming method according to claim 122, wherein the conductive magnetic particles have single-component crystals or mixed crystals of a conductive metal or metals.

134. The image forming method according to claim 122, wherein the conductive magnetic particles comprise particles having a particulate conductive magnetic material dispersed in a binder polymer.

135. The image forming method according to claim 122, wherein a surface of the conductive magnetic particles is coated with a resin having a conductive agent.

136. The image forming method according to claim 122, wherein the conductive magnetic particles have an average particle diameter of from 1 µm to 100 µm.

137. The image forming method according to claim 122, wherein the conductive magnetic particles have a volume resistivity of at most $10^{10}$ $\Omega$.cm.

138. The image forming method according to claim 122, wherein the conductive magnetic particles have a saturation magnetization of at least 30 $Am^2/kg$.

139. The image forming method according to claim 122, wherein the image bearing member is charged by applying a direct current voltage to the magnetic brush charging assembly.

140. The image forming method according to claim 122, wherein the image bearing member is charged by applying a voltage produced by superimposing an alternating current voltage on a direct current voltage to the magnetic brush charging assembly.

141. The image forming method according to claim 122, wherein the transfer medium to which the toner image is transferred is a final transfer medium.

142. The image forming method according to claim 122, wherein the transfer medium to which the toner image is transferred is an intermediate transfer medium.

143. The image forming method according to claim 142, wherein the toner image transferred to the intermediate transfer medium is transferred to a final transfer medium.

144. The image forming method according to claim 122, wherein a portion of the magnetic toner remaining on the image bearing member after transferring the toner image is removed by a cleaning means provided between a transfer zone and a charging zone, and magnetic toner not removed by the cleaning means enters the magnetic brush charging assembly and thereafter is unloaded from the magnetic brush charging assembly.

145. The image forming method according to claim 122, wherein magnetic toner remaining on the image bearing member after transferring the toner image enters the magnetic brush charging assembly and thereafter is unloaded from the magnetic brush charging assembly, and the magnetic toner thus unloaded is simultaneously removed during development by a developing means for developing the electrostatic latent image on the image bearing member with the magnetic toner.

146. The image forming method according to claim 145, wherein the magnetic toner is a spherical magnetic toner.

147. The image forming method according to claim 146, wherein the spherical magnetic toner has a shape coefficient SF-1 of from 100 to 150 and SF-2 of from 100 to 130.

148. The image forming method according to claim 122, wherein the magnetic brush charging assembly comprises a non-magnetic sleeve, a magnet roll provided inside the non-magnetic sleeve and conductive magnetic particles magnetically bound to a surface of the non-magnetic sleeve.

149. The image forming method according to claim 148, wherein the magnetic brush charging assembly has a magnetic strength of 400–1500 gauss on the non-magnetic sleeve surface.

150. The image forming method according to claim 148, wherein the magnetic brush charging assembly has a magnetic strength of 600–1300 gauss on the non-magnetic sleeve surface.

151. The image forming method according to claim 148, wherein the magnet roll has two or more magnetic poles.

152. The image forming method according to claim 148, wherein the image bearing member comprises a photosensitive drum, and magnetic poles of the magnet roll are set in the magnetic brush charging assembly so that a peak of a magnetic force may be present within an angle of 20°, in a rotation direction of the photosensitive drum, measuring from a line connecting centers of the photosensitive drum and the magnetic brush charging assembly.

153. The image forming method according to claim 148, wherein the image-bearing member comprises a photosensitive drum, and magnetic poles of the magnet roll are set in the magnetic brush charging assembly so that a peak of a magnetic force may be present within an angle of 10°, in a rotation direction of the photosensitive drum, measuring from a line connecting centers of the photosensitive drum and the magnetic brush charging assembly.

154. The image forming method according to claim 148, wherein the image bearing member comprises a photosensitive drum, and the magnetic brush charging assembly rotates in a same direction as the photosensitive drum.

155. The image forming method according to claim 154, wherein rotation of the magnetic brush charging assembly is achieved by fixing the magnet roll and rotating the non-magnetic sleeve.

156. The image forming method according to claim 154, wherein the photosensitive drum and the magnetic brush charging assembly rotate at the same peripheral speed.

157. An image forming apparatus comprising:

an image bearing member for bearing an electrostatic latent image;

a charging means for electrostatically charging said image bearing member;

a latent image forming means for forming an electrostatic latent image on said charged image bearing member;

a developing means for rendering the electrostatic latent image visible by development with a magnetic toner to form a toner image; and a transfer means for transferring the toner image to a transfer medium, wherein said charging means comprises a magnetic brush charging assembly having a magnetic brush formed of conductive magnetic particles magnetically bound, said magnetic brush charging assembly coming into contact with said image bearing member and being capable of electrostatically charging a surface of said image bearing member, and wherein the magnetic toner has a value of $\sigma.D.\delta$ of 150 or less, the value being obtained by multiplying (i) a magnetization quantity $\sigma$ ($Am^2/kg$) in a magnetic field of 1K oersted as measured by a vibration magnetometer, (ii) a weight average particle diameter D ($\mu m$) of the magnetic toner and (iii) a density $\delta$ ($g/cm^3$) thereof.

158. The image forming apparatus according to claim 157, wherein the magnetic toner has a value of $\sigma.D.\delta$ within a range of from 50 to 150.

159. The image forming apparatus according to claim 157, wherein the magnetic toner has a value of $\sigma.D.\delta$ within a range of from 100 to 130.

160. The image forming apparatus according to claim 157, wherein the magnetic toner has a magnetization quantity of from 10 $Am^2/kg$ to 30 $Am^2/kg$.

161. The image forming apparatus according to claim 157, wherein the magnetic toner has a magnetization quantity of from 10 $Am^2/kg$ to 20 $Am^2/kg$.

162. The image forming apparatus according to claim 157, wherein the magnetic toner has a weight average particle diameter of from 2 $\mu m$ to 20 $\mu m$.

163. The image forming apparatus according to claim 157, wherein the magnetic toner has a weight average particle diameter of from 4 $\mu m$ to 8 $\mu m$.

164. The image forming apparatus according to claim 157, wherein the magnetic toner has a density of from 1.1 to 2.0.

165. The image forming apparatus according to claim 157, wherein the magnetic toner has a density of from 1.1 to 1.6.

166. The image forming apparatus according to claim 157, wherein the magnetic toner is a spherical magnetic toner.

167. The image forming apparatus according to claim 166, wherein the spherical magnetic toner has a shape coefficient SF-1 of from 100 to 150 and SF-2 of from 100 to 130.

168. The image forming apparatus according to claim 157, wherein the conductive magnetic particles have single-component crystals or mixed crystals of a conductive metal or metals.

169. The image forming apparatus according to claim 157, wherein the conductive magnetic particles include a particulate conductive magnetic material dispersed in a binder polymer.

170. The image forming apparatus according to claim 157, wherein a surface of the conductive magnetic particles is coated with a resin having a conductive agent.

171. The image forming apparatus according to claim 157, wherein the conductive magnetic particles have an average particle diameter of from 1 μm to 100 μm.

172. The image forming apparatus according to claim 157, wherein the conductive magnetic particles have a volume resistivity of $10^{10}$ Ω.cm or below.

173. The image forming apparatus according to claim 157, wherein the conductive magnetic particles have a volume resistivity of $10^6$ Ω.cm to $10^9$ Ω.cm.

174. The image forming apparatus according to claim 157, wherein the conductive magnetic particles have a saturation magnetization of at least 30 Am$^2$/kg.

175. The image forming apparatus according to claim 157, wherein the magnetic brush charging assembly charges said image bearing member by applying a direct current.

176. The image forming apparatus according to claim 157, wherein the magnetic brush charging assembly charges said image bearing member by applying a voltage produced by superimposing an alternating current voltage on a direct current voltage.

177. The image forming apparatus according to claim 157, wherein the transfer medium to which the toner image is transferred is a final transfer medium.

178. The image forming apparatus according to claim 157, wherein the transfer medium to which the toner image is transferred is an intermediate transfer medium.

179. The image forming apparatus according to claim 178, wherein the toner image transferred to the intermediate transfer medium is transferred to a final transfer medium.

180. The image forming apparatus according to claim 157, further comprising a cleaning means for removing a portion of the magnetic toner remaining on said image bearing member after transferring the toner image, said cleaning means being provided between a transfer zone and a charging zone, and magnetic toner not removed by said cleaning means enters the magnetic brush charging assembly, and thereafter is unloaded from the magnetic brush charging assembly.

181. The image forming apparatus according to claim 157, wherein said developing means develops the electrostatic latent image on said image bearing member using the magnetic toner, and simultaneously removes a portion of the magnetic toner remaining on said image bearing member after transferring the toner image, magnetic toner remaining on the image bearing member after transferring the toner image enters the magnetic brush charging assembly and thereafter is unloaded from the magnetic brush charging assembly, and is removed by said developing means.

182. The image forming apparatus according to claim 181, wherein the magnetic toner is a spherical magnetic toner.

183. The image forming apparatus according to claim 182, wherein the spherical magnetic toner has a shape coefficient SF-1 of from 100 to 150 and SF-2 of from 100 to 130.

184. The image forming apparatus according to claim 157, wherein the magnetic brush charging assembly comprises a non-magnetic sleeve, a magnet roll provided inside the non-magnetic sleeve and conductive magnetic particles magnetically bound to a surface of the non-magnetic sleeve.

185. The image forming apparatus according to claim 184, wherein the magnetic brush charging assembly has a magnetic strength of 400–1500 gauss on the non-magnetic sleeve surface.

186. The image forming apparatus according to claim 184, wherein the magnetic brush charging assembly has a magnetic strength of 600–1300 gauss on the non-magnetic sleeve surface.

187. The image forming apparatus according to claim 184, wherein the magnet roll has two or more magnetic poles.

188. The image forming apparatus according tO claim 184, wherein said image bearing member comprises a photosensitive drum, and magnetic poles of the magnet roll are set in the magnetic brush charging assembly so that a peak of a magnetic force may be present within an angle of 20°, in a rotation direction of the photosensitive drum, measuring from a line connecting centers of the photosensitive drum and the magnetic brush charging assembly.

189. The image forming apparatus according to claim 184, wherein said image-bearing member comprises a photosensitive drum, and magnetic poles of the magnet roll are set in the magnetic brush charging assembly so that a peak of a magnetic force may be present within an angle of 10°, in a rotation direction of the photosensitive drum, measuring from a line connecting centers of the photosensitive drum and the magnetic brush charging assembly.

190. The image forming apparatus according to claim 184, wherein said image bearing member comprises a photosensitive drum, and the magnetic brush charging assembly rotates in a same direction as the photosensitive drum.

191. The image forming apparatus according to claim 190, wherein rotation of the magnetic brush charging assembly is achieved by fixing the magnet roll and rotating the non-magnetic sleeve.

192. The image-forming apparatus according to claim 190, wherein the photosensitive drum and the magnetic brush charging assembly rotate at a same peripheral speed.

193. A process cartridge detachably mountable to a main assembly of an image forming apparatus, said process cartridge comprising:
   an image bearing member for bearing an electrostatic latent image;
   a charging means for electrostatically charging said image bearing member; and
   a developing means for rendering visible the electrostatic latent image held on said image bearing member by development with a magnetic toner to form a toner image,
   wherein said charging means comprises a magnetic brush charging assembly having a magnetic brush formed of conductive magnetic particles magnetically bound, the charging assembly coming into contact with said image bearing member and being capable of electrostatically charging a surface of the image bearing member, and
   wherein the magnetic toner has a value of σ.D.δ of 150 or less, said value being obtained by multiplying (i) a magnetization quantity σ (Am$^2$/kg) in a magnetic field of 1K oersted as measured by a vibration magnetometer, (ii) a weight average particle diameter D (μm) of the magnetic toner and (iii) a density δ (g/cm$^3$) thereof.

194. The process cartridge according to claim 193, wherein the magnetic toner has a value of σ.D.δ within a range of from 50 to 150.

195. The process cartridge according to claim 193, wherein the magnetic toner has a value of σ.D.δ within a range of from 100 to 130.

196. The process cartridge according to claim 193, wherein the magnetic toner has a magnetization quantity of from 10 Am$^2$/kg to 30 Am$^2$/kg.

197. The process cartridge according to claim 193, wherein the magnetic toner has a magnetization quantity of from 10 Am²/kg to 20 Am²/kg.

198. The process cartridge according to claim 193, wherein the magnetic toner has a weight average particle diameter of from 2 μm to 20 μm.

199. The process cartridge according to claim 193, wherein the magnetic toner has a weight average particle diameter of from 4 μm to 8 μm.

200. The process cartridge according to claim 193, wherein the magnetic toner has a density of from 1.1 to 2.0.

201. The process cartridge according to claim 193, wherein the magnetic toner has a density of from 1.1 to 1.6.

202. The process cartridge according to claim 193, wherein the magnetic toner is a spherical magnetic toner.

203. The process cartridge according to claim 202, wherein the spherical magnetic toner has a shape coefficient SF-1 of from 100 to 150 and SF-2 of from 100 to 130.

204. The process cartridge according to claim 193, wherein the conductive magnetic particles have single-component crystals or mixed crystals of a conductive metal or metals.

205. The process cartridge according to claim 193, wherein the conductive magnetic particles comprise a particulate conductive magnetic material dispersed in a binder polymer.

206. The process cartridge according to claim 193, wherein a surface of said conductive magnetic particles is coated with a resin having a conductive agent.

207. The process cartridge according to claim 193, wherein the conductive magnetic particles have an average particle diameter of from 1 μm to 100 μm.

208. The process cartridge according to claim 193, wherein the conductive magnetic particles have a volume resistivity of at most $10^{10}$ Ω.

209. The process cartridge according to claim 193, wherein the conductive magnetic particles have a saturation magnetization of at least 30 Am²/kg.

210. The process cartridge according to claim 193, wherein the conductive magnetic particles have a saturation magnetization of from 40 Am²/kg to 300 Am²/kg.

211. The process cartridge according to claim 193, further comprising a cleaning means for removing a portion of the magnetic toner remaining on said image bearing member after a transfer operation, said cleaning means being provided at an upstream position from said magnetic brush charging assembly, and magnetic toner not removed by said cleaning means enters said magnetic brush charging assembly, and thereafter is unloaded from the magnetic brush charging assembly.

212. The process cartridge according to claim 193, wherein said developing means develops the electrostatic latent image on the image bearing member with the magnetic toner and simultaneously removes the magnetic toner remaining on said image bearing member, the magnetic toner having remained on said image bearing member after a transfer operation enters said magnetic brush charging assembly, and thereafter is unloaded from the magnetic brush charging assembly, and the magnetic toner thus unloaded is removed by said developing means.

213. The process cartridge according to claim 212, wherein the magnetic toner is a spherical magnetic toner.

214. The process cartridge according to claim 213, wherein the spherical magnetic toner has a shape coefficient SF-1 of from 100 to 150 and SF-2 of from 100 to 130.

215. The process cartridge according to claim 193, wherein the magnetic brush charging assembly comprises a non-magnetic sleeve, a magnet roll provided inside the non-magnetic sleeve and conductive magnetic particles magnetically bound to a surface of the non-magnetic sleeve.

216. The process cartridge according to claim 215 wherein the magnetic brush charging assembly has a magnetic strength of 400–1500 gauss on the non-magnetic sleeve surface.

217. The process cartridge according to claim 215, wherein the magnetic brush charging assembly has a magnetic strength of 600–1300 gauss on the non-magnetic sleeve surface.

218. The process cartridge according to claim 215, wherein the magnet roll has two or more magnetic poles.

219. The process cartridge according to claim 215, wherein said image bearing member comprises a photosensitive drum, and magnetic poles of the magnet roll are set in the magnetic brush charging assembly so that a peak of a magnetic force may be present within an angle of 20°, in a rotation direction of the photosensitive drum, measuring from a line connecting centers of the photosensitive drum and the magnetic brush charging assembly.

220. The process cartridge according to claim 215, wherein said image-bearing member comprises a photosensitive drum, and magnetic poles of the magnet roll are set in the magnetic brush charging assembly so that a peak of a magnetic force may be present within an angle of 10°, in a rotation direction of the photosensitive drum, measuring from a line connecting centers of the photosensitive drum and the magnetic brush charging assembly.

221. The process cartridge according to claim 215, wherein said image bearing member comprises a photosensitive drum, and the magnetic brush charging assembly rotates in a same direction as the photosensitive drum.

222. The process cartridge according to claim 221, wherein rotation of the magnetic brush charging assembly is achieved by fixing the magnet roll and rotating the non-magnetic sleeve.

223. The process cartridge according to claim 221, wherein the photosensitive drum and the magnetic brush charging assembly rotate at a same peripheral speed.

* * * * *

UNITED STATES PATENT AND TRADEMARK OFFICE
CERTIFICATE OF CORRECTION

PATENT NO. : 5,659,852
DATED : Aug. 19, 1997
INVENTOR(S) : CHIGONO, ET AL.

It is certified that error appears in the above-identified patent and that said Letters Patent is hereby corrected as shown below:

Column 1,

Line 60, "of the photosensitive" should read --of the photosensitive member--.

Column 5,

Line 11, "remained magnetic toner" should read --magnetic toner remaining--.

Column 7,

Line 42, "On" should read --on--.

Column 10,

Line 15, "toner" should read --toner,--.
   Line 16, "entered" should read --having entered--, and "2" should read --2,--.

Column 11,

Line 25, "remained" should read --remaining--.

Column 12,

Line 42, "have" should read --has--.

Column 13,

Line 25, "Of" should read --of--.

UNITED STATES PATENT AND TRADEMARK OFFICE
CERTIFICATE OF CORRECTION

PATENT NO. : 5,659,852
DATED : Aug. 19, 1997
INVENTOR(S) : CHIGONO, ET AL.

It is certified that error appears in the above-identified patent and that said Letters Patent is hereby corrected as shown below:

Column 14,

Line 50, "preferably carried" should read --preferably carry--.

Column 15,

Line 20, "entered" should read --entering--.
   Line 27, "Examples 1" should read --Example 1--.
   Line 64, "a" should be deleted.

Column 18,

Table 1, Example 3

"Mn-doped 30 magnetite:" should read --Mn-doped magnetite: 30--.

Table 1, Example 4

"Nichekl" should read --Nickel--.
      "D = 5" should read --D = 5
                           $\delta$ = 1.45 --.

Table 1, Example 5,

"$\sigma$ = 20" should read --$\sigma$ = 15--.

UNITED STATES PATENT AND TRADEMARK OFFICE
CERTIFICATE OF CORRECTION

PATENT NO. : 5,659,852
DATED : Aug. 19, 1997
INVENTOR(S) : CHIGONO, ET AL.

It is certified that error appears in the above-identified patent and that said Letters Patent is hereby corrected as shown below:

COLUMN 18 (Continued)

Table 1, Example 6,

"Mn-doped 100 magnetite"    should read    --Mn-doped magnetite: 100--.

Column 19,

Table 1, Comparative Example 3,

"Mn-doped 200 magnetite:"    should read    --Mn-doped magnetite: 200--.

Column 22,

Table 2, Example 11,

"Mn-doped 30 magnetite"    should read    --Mn-doped magnetitie 30--.

Table 2, Example 14,

"Mn-doped 100 magnetite:"    should read    --Mn-doped magnetite: 100--.

Table 2, Comparative Example 7,

"Mn-doped 200 magnetite:"    should read    --Mn-doped magnetite: 200--.

UNITED STATES PATENT AND TRADEMARK OFFICE
CERTIFICATE OF CORRECTION

PATENT NO. : 5,659,852
DATED : Aug. 19, 1997
INVENTOR(S) : CHIGONO, ET AL.

It is certified that error appears in the above-identified patent and that said Letters Patent is hereby corrected as shown below:

Column 24,

Line 24, "are" should read --is--.

Column 27,

Line 13, "are" should read --is--.
    Line 56, "remove" should read --removes--.

Column 34,

Line 11, "tO" should read --to--.

Column 35,

Line 33, "$10^{10}\Omega.$" should read --$10^{10}\Omega.cm.$--.

Column 36,

Line 16, "claim 215" should read --claim 215,--.

Signed and Sealed this

Fourteenth Day of July, 1998

Attest:

BRUCE LEHMAN

*Attesting Officer*      *Commissioner of Patents and Trademarks*